(12) United States Patent
Kawabata

(10) Patent No.: US 8,724,804 B2
(45) Date of Patent: May 13, 2014

(54) ENCRYPTION PROCESSING APPARATUS

(75) Inventor: Takeshi Kawabata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/611,885

(22) Filed: Sep. 12, 2012

(65) Prior Publication Data

US 2013/0077790 A1   Mar. 28, 2013

(30) Foreign Application Priority Data

Sep. 27, 2011   (JP) ................................ 2011-210966

(51) Int. Cl.
*H04L 29/06*   (2006.01)

(52) U.S. Cl.
USPC ................................ 380/44; 726/36; 380/264

(58) Field of Classification Search
USPC ......................................................... 380/277
See application file for complete search history.

(56) References Cited

U.S. PATENT DOCUMENTS

| | | | |
|---|---|---|---|
| 7,899,190 B2 * | 3/2011 | Gebotys | 380/286 |
| 2002/0159599 A1 * | 10/2002 | Matsui et al. | 380/263 |
| 2003/0048903 A1 | 3/2003 | Ito et al. | |
| 2003/0059044 A1 * | 3/2003 | Shimizu et al. | 380/37 |
| 2007/0140478 A1 | 6/2007 | Komano et al. | |
| 2008/0056490 A1 * | 3/2008 | Akishita et al. | 380/44 |
| 2008/0285743 A1 * | 11/2008 | Yokota et al. | 380/28 |
| 2008/0292100 A1 | 11/2008 | Komano et al. | |
| 2009/0003598 A1 * | 1/2009 | Itoh et al. | 380/46 |
| 2010/0002872 A1 * | 1/2010 | Shibutani et al. | 380/28 |
| 2010/0266122 A1 * | 10/2010 | Suzaki et al. | 380/28 |
| 2011/0268266 A1 * | 11/2011 | Fujisaki et al. | 380/28 |
| 2012/0237035 A1 * | 9/2012 | Kawabata et al. | 380/277 |

FOREIGN PATENT DOCUMENTS

JP   2007-189659   7/2007

OTHER PUBLICATIONS

Extended European Search Report issued by the European Patent Office on Jan. 30, 2013, for European Patent Application No. 12185644.7.
Japanese Office Action dated Oct. 22, 2013, issued in Japanese Application No. 2011-210966 (3 pages).

* cited by examiner

*Primary Examiner* — Hadi Armouche
*Assistant Examiner* — Bryan Wright
(74) *Attorney, Agent, or Firm* — Finnegan, Henderson, Farabow, Garrett & Dunner, L.L.P.

(57) ABSTRACT

According to an embodiment, a first linear transformation unit performs a linear transformation from mask data to first mask data. A second linear transformation unit performs a linear transformation from mask data to second mask data. A first calculator calculates first data based upon data to be processed and the first mask data. A selecting unit selects the first data or the second mask data. A non-linear transformation unit performs a non-linear transformation on the selected first data or second mask data. A second calculator calculates second data based upon the first data after the non-linear transformation and the mask data. A third linear transformation unit performs a linear transformation on the second data. The second data after the linear transformation by the third linear transformation unit is retained as new data to be processed, and the second mask data after the non-linear transformation is retained as new mask data.

4 Claims, 16 Drawing Sheets

| CLOCK | DATA REGISTER 11 | RANDOM NUMBER REGISTER 22 | RANDOM NUMBER REGISTER 21 |
|---|---|---|---|
| 1 | Data^Mask | | Mask |
| 2 | B(Data^Mask)^Key | mask'=B(Mask) | ↓ |
| 3 | ↓ | ↓ | mask=A(C(Mask)) |
| 4 | B(Data^mask)^Key | mask'=B(mask) | ↓ |
| ⋮ | ⋮ | ⋮ | ⋮ |

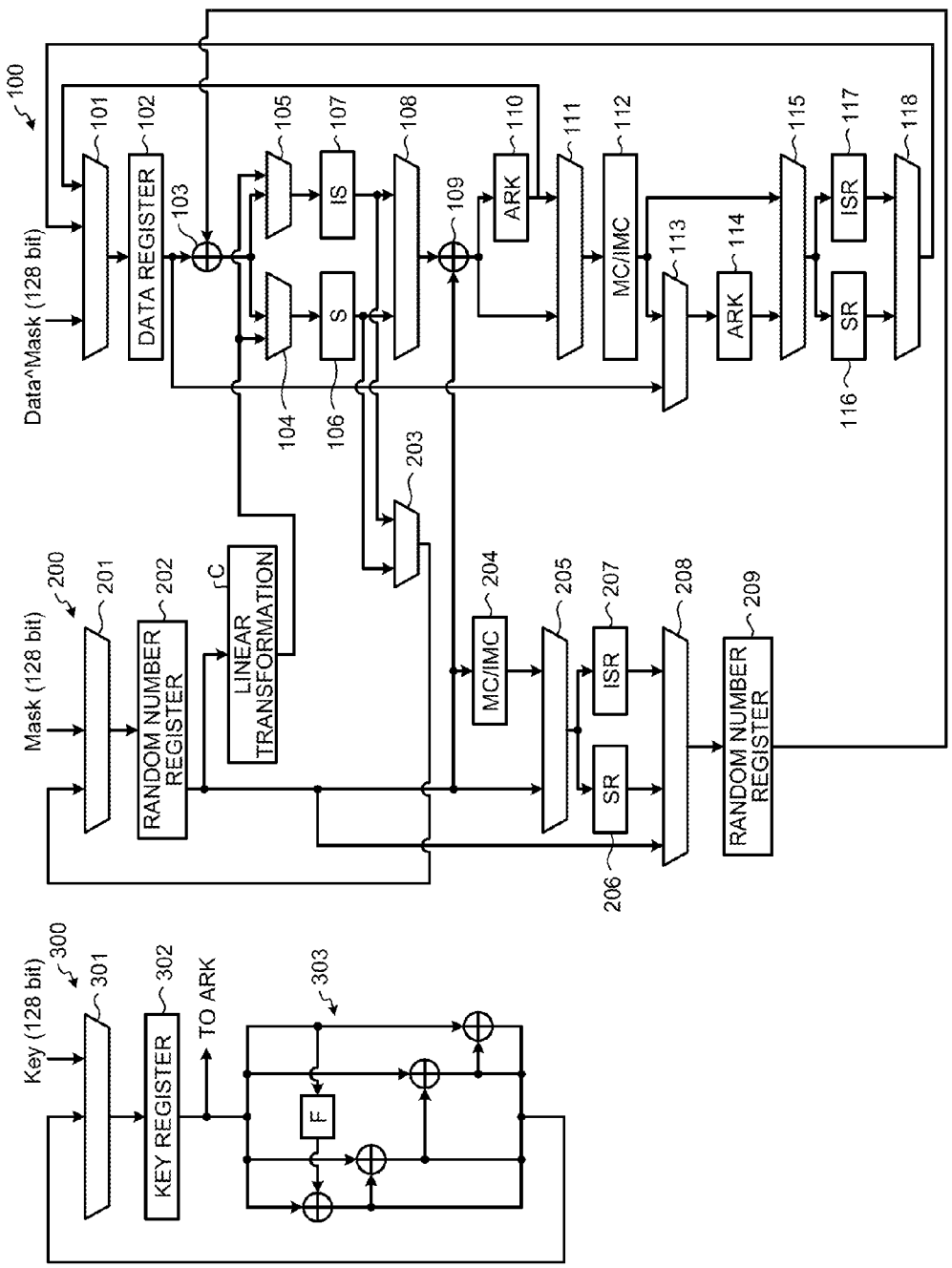

FIG.12

| CLOCK | DATA REGISTER 102 | CONTENT OF PROCESSING | RANDOM NUMBER REGISTER 202 | RANDOM NUMBER REGISTER 209 |
|---|---|---|---|---|
| 0 | Data^Mask | | Mask | |
| 1 | data1= SR(Data^Mask^Key0) | ARK, SR | mask1=IS(C(Mask)) | Mask'=SR(Mask) |
| 2 | data2= SR(MC(S(data1^Mask1')^mask2)^key2) | S, MC, ARK, SR | mask2=IS(C(mask1)) | Mask1'=SR(MC(mask1)) |
| 3 | data3= SR(MC(S(data2^Mask2')^mask2)^key2) | S, MC, ARK, SR | mask3=IS(C(mask2)) | Mask2'=SR(MC(mask2)) |
| 4 | data4= SR(MC(S(data3^Mask3')^mask3)^key3) | S, MC, ARK, SR | mask4=IS(C(mask3)) | Mask3'=SR(MC(mask3)) |
| 5 | data5= SR(MC(S(data4^Mask4')^mask4)^key4) | S, MC, ARK, SR | mask5=IS(C(mask4)) | Mask4'=SR(MC(mask4)) |
| 6 | data6= SR(MC(S(data5^Mask5')^mask5)^key5) | S, MC, ARK, SR | mask6=IS(C(mask5)) | Mask5'=SR(MC(mask5)) |
| 7 | data7= SR(MC(S(data6^Mask6')^mask6)^key6) | S, MC, ARK, SR | mask7=IS(C(mask6)) | Mask6'=SR(MC(mask6)) |
| 8 | data8= SR(MC(S(data7^Mask7')^mask7)^key7) | S, MC, ARK, SR | mask8=IS(C(mask7)) | Mask7'=SR(MC(mask7)) |
| 9 | data9= SR(MC(S(data8^Mask8')^mask8)^key8) | S, MC, ARK, SR | mask9=IS(C(mask8)) | Mask8'=SR(MC(mask8)) |
| 10 | data10= SR(MC(S(data9^Mask9')^mask9)^key9) | S, ARK | mask10=IS(C(mask9)) | Mask9'=SR(MC(mask9)) |
| 11 | data11= (S(data10^Mask9')^mask10)^key10 | | | |

FIG.15

| CLOCK | KEY REGISTER [k3, k2, k1, k0] | CONTENT OF PROCESSING | DATA REGISTER [d3, d2, d1, d0] | CONTENT OF PROCESSING | RANDOM NUMBER REGISTER [r4, r3, r2, r1, r0] | CONTENT OF PROCESSING |
|---|---|---|---|---|---|---|
| 0 | K30, K20, K10, K00 | | D300, D200, D100, D000 | D301=ARK(D300) | R300, ----, ----, ----, ---- | R301=R300 |
| 1 | → | | D200, D100, D000, D301 | D201=ARK(D200) | R200, ----, ----, ----, R301 | R201=R200 |
| 2 | → | | D100, D000, D301, D201 | D101=ARK(D100) | R100, ----, ----, R301, R201 | R101=R100 |
| 3 | → | | D000, D301, D201, D101 | D001=ARK(D000) | R000, ----, R301, R201, R101 | R001=R000 |
| 4 | → | sbox+ α | D301, D201, D101, D001 | D*10=SR(D*0*) | R000, R301, R201, R101, R001 | R*0d= R310=S(C(R000)), SR(R301, R201, R101, R001) |
| 5 | K31, K21, K11, K01 | | D310, D110, D210, D010 | D311= ARK(MC(S(D301))) | R310, R30d, R20d, R10d, R00d | R210=S(C(R310)) R311=MC(R310) |
| 6 | → | | D210, D010, D110, D311 | D211= ARK(MC(S(D201))) | R210, R20d, R10d, R00d, R311 | R110=S(C(R210)) R211=MC(R210) |
| 7 | → | | D110, D010, D312, D211 | D111= ARK(MC(S(D101))) | R110, R10d, R00d, R311, R211 | R010=S(C(R110)) R111=MC(R110) |
| 8 | → | | D010, D312, D212, D111 | D011= ARK(MC(S(D001))) | R010, R00d, R311, R211, R111 | R320=S(C(R010)) R011=MC(R010) |
| 9 | → | sbox+ α | D312, D212, D112, D011 | D*20=SR(D*1*) | R320, R311, R211, R111, R011 | R*1d=SR(R311, R211, R111, R011) |
| 10 | K32, K22, K12, K02 | | D320, D220, D120, D020 | D321= ARK(MC(S(D320))) | R320, R31d, R21d, R11d, R01d | R220=S(C(R320)) R321=MC(R320) |

FIG.17

| CLOCK | KEY REGISTER [k3, k2, k1, k0] | CONTENT OF PROCESSING | DATA REGISTER [d3, d2, d1, d0] | CONTENT OF PROCESSING | RANDOM NUMBER REGISTER [r4, r3, r2, r1, r0] | CONTENT OF PROCESSING |
|---|---|---|---|---|---|---|
| 0 | K30, K20, K10, K00 | | D300, D200, D100, D000 | D301=ARK(D300) | R300, ----, ----, ----, ---- | R301=R300 |
| 1 | → | | D200, D100, D000, D301 | D201=ARK(D200) | R200, ----, ----, ----, R301 | R201=R200 |
| 2 | → | | D100, D000, D301, D201 | D101=ARK(D100) | R100, ----, ----, R301, R201 | R101=R100 |
| 3 | → | | D000, D301, D201, D101 | D001=ARK(D000) | R000, ----, R301, R201, R101 | R001=R000 |
| 4 | → | sbox+α | D301, D201, D101, D001 | D*10=SR(D*0*) | R000, R301, R201, R101, R001 | R310=S(C(R000))<br>R*0d=SR(R301, R201, R101, R001) |
| 5 | K31, K21, K11, K01 | | D310, D210, D110, D010 | D311=ARK(MC(S(D301))) | R310, R30d, R20d, R10d, R00d | R311=MC(R310) |
| 6 | → | | D210, D110, D010, D311 | | R310, R20d, R10d, R00d, R311 | R210=S(C(R310)) |
| 7 | → | | D110, D010, D311, D211 | D211=ARK(MC(S(D201))) | R210, R20d, R10d, R00d, R311 | R211=MC(R210) |
| 8 | → | | D010, D311, D110, D211 | | R210, R10d, R00d, R311, R211 | R110=S(C(R210)) |
| 9 | → | | D110, D010, D311, D211 | D111=ARK(MC(S(D101))) | R110, R10d, R00d, R311, R211 | R111=MC(R110) |
| 10 | → | | D010, D311, D212, D111 | | R110, R00d, R311, R211, R111 | R010=S(C(R110)) |
| 11 | → | | D010, D312, D212, D111 | D011=ARK(MC(S(D001))) | R010, R00d, R311, R211, R111 | R011=MC(R010) |
| 12 | → | | D312, D212, D112, D011 | | R010, R311, R211, R111, R011 | R320=S(C(R010)) |
| 13 | → | sbox+α | D312, D212, D112, D011 | D*20=SR(D*1*) | R320, R311, R211, R111, R011 | R*1d=SR(R311, R211, R111, R011) |

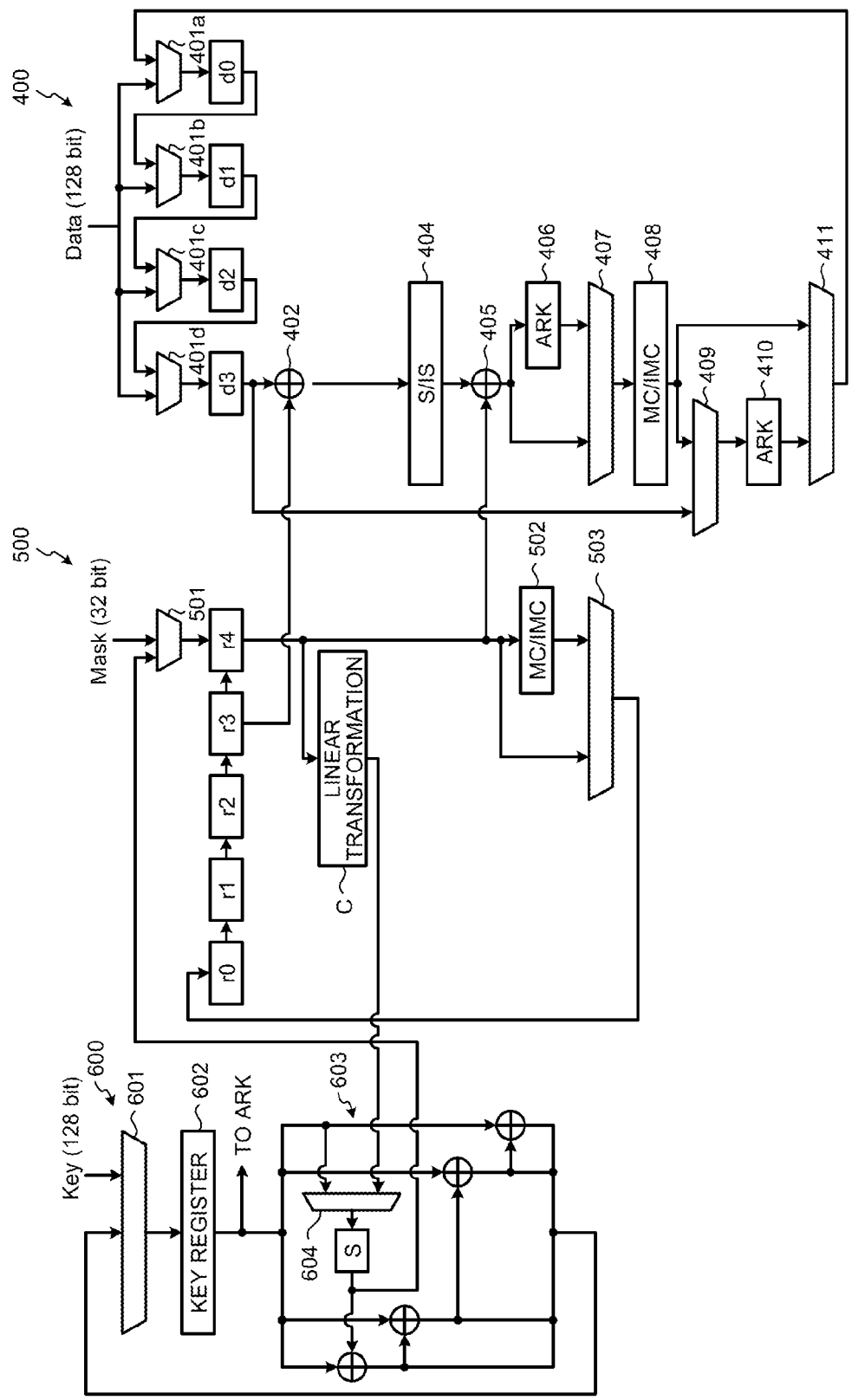

FIG.19

| CLOCK | KEY REGISTER [k3, k2, k1, k0] | CONTENT OF PROCESSING | DATA REGISTER [d3, d2, d1, d0] | CONTENT OF PROCESSING | RANDOM NUMBER REGISTER [r4, r3, r2, r1, r0] | CONTENT OF PROCESSING |
|---|---|---|---|---|---|---|
| 0 | K30, K20, K10, K00 | | D300, D200, D100, D000 | D301=ARK(D300) | R300, ----, ----, ----, ---- | R301=R300 |
| 1 | → | | D200, D100, D000, D301 | D201=ARK(D200) | R200, ----, ----, ----, R301 | R201=R200 |
| 2 | → | | D100, D000, D301, D201 | D101=ARK(D100) | R100, ----, ----, R301, R201 | R101=R100 |
| 3 | → | | D000, D301, D201, D101 | D001=ARK(D000) | R000, ----, R301, R201, R101 | R001=R000 |
| 4 | → | sbox+α | D301, D201, D101, D001 | D*10=SR(D0*) | R000, R301, R201, R101, R001 | R*0d= SR(R301, R201, R101, R001) |
| 5 | → | | D310, D210, D110, D010 | | R000, R30d, R20d, R10d, R00d | R310=S(C(R310)) |
| 6 | K31, K21, K11, K01 | | D310, D210, D110, D010 | D311=ARK(MC(S(D301))) | R310, R30d, R20d, R10d, R00d | R210=S(C(R310)) R311=MC(R310) |
| 7 | → | | D210, D110, D010, D311 | D211=ARK(MC(S(D201))) | R210, R20d, R10d, R00d, R311 | R110=S(C(R210)) R211=MC(R210) |
| 8 | → | | D110, D010, D312, D211 | D111=ARK(MC(S(D101))) | R110, R10d, R00d, R311, R211 | R010=S(C(R110)) R111=MC(R110) |
| 9 | → | | D010, D312, D212, D111 | D011=ARK(MC(S(D001))) | R010, R00d, R311, R211, R111 | R320=S(C(R010)) R011=MC(R010) |
| 10 | → | sbox+α | D312, D212, D112, D011 | D*20=SR(D*1*) | R320, R311, R211, R111, R011 | R*1d=SR(R311, R211, R111, R011) |

ENCRYPTION PROCESSING APPARATUS

CROSS-REFERENCE TO RELATED APPLICATION(S)

This application is based upon and claims the benefit of priority from Japanese Patent Application No. 2011-210966, filed on Sep. 27, 2011; the entire contents of which are incorporated herein by reference.

FIELD

Embodiments herein relate generally to an encryption processing apparatus that executes an encryption or decryption.

BACKGROUND

An encryption processing apparatus encrypts a plaintext and decrypts an encrypted-text by use of a specific algorithm. A side-channel attack to the encryption processing apparatus has been reported, the side-channel attack being a passive attack, such as SPA (Simple Power Analysis) or DPA (Differential Power Analysis), which derives an internal secret key only by measuring power or electromagnetic wave during an operation. A countermeasure for the side-channel attack is essential and significant, since the side-channel attack does not leave the trace of the attack.

The side-channel attack is performed by deriving consumption power and/or electromagnetic wave that can be measured during a computation of the encryption process or decryption process, and a secret key that can be calculated from an estimated secret key and that has high similarity to intermediate data. As a countermeasure for the side-channel attack, there has been known a technique of disturbing the intermediate data by masking the intermediate data with use of random numbers to make it difficult to determine the degree of similarity, which invalidates the side-channel attack.

A conventional encryption processing apparatus having incorporated therein a countermeasure for the side-channel attack includes a physical random number generator circuit or pseudo random number generator circuit independently of an encryption circuit. Therefore, the circuit scale is increased, and the power consumption tends to increase. For example, an encryption processing apparatus mounted to a compact portable device such as an IC card needs to decrease the circuit scale and power consumption as much as possible. Accordingly, it has been desired to invalidate the side-channel attack with reduced circuit scale and power consumption.

BRIEF DESCRIPTION OF THE DRAWINGS

FIG. 11 is a circuit diagram illustrating an encryption processing apparatus according to a first example;

FIG. 12 is a view for describing an encryption process by the encryption processing apparatus according to the first example;

FIG. 15 is a view for describing an encryption process by the encryption processing apparatus according to the second example;

FIG. 17 is a view for describing an encryption process by the encryption processing apparatus according to the modification of the second example;

FIG. 18 is a circuit diagram illustrating another modification of the encryption processing apparatus according to the second example; and FIG. 19 is a view for describing an encryption process by the encryption processing apparatus according to another modification of the second example.

DETAILED DESCRIPTION

According to an embodiment, an encryption processing apparatus includes a data retaining unit configured to retain data to be processed; a mask retaining unit configured to retain mask data; a first linear transformation unit configured to perform a linear transformation from the mask data to first mask data; a second linear transformation unit configured to perform a linear transformation from the mask data to second mask data; a first calculator configured to calculate first data based upon the data to be processed retained in the data retaining unit and the first mask data; a selecting unit configured to select either one of the first data and the second mask data; a non-linear transformation unit configured to perform a non-linear transformation on the first data or the second mask data selected by the selecting unit; a second calculator configured to calculate second data based upon the first data on which the non-linear transformation is performed by the non-linear transformation unit, and the mask data retained in the mask retaining unit; and a third linear transformation unit configured to perform a linear transformation on the second data. The second data on which the linear transformation is performed by the third linear transformation unit is retained in the data retaining unit as new data to be processed. The second mask data on which the non-linear transformation is performed by the non-linear transformation unit is retained in the mask retaining unit as new mask data.

An encryption processing apparatus according to an embodiment is an encryption processing apparatus that performs encryption/decryption according to a block cipher mode, and particularly, is an encryption processing apparatus having incorporated therein a countermeasure for invalidating a side-channel attack (hereinafter referred to as a side-channel countermeasure).

An outline of the side-channel attack will firstly be described, taking DPA that is a threat to the encryption processing apparatus as an example. The DPA is an attack for statistically estimating a secret key by measuring consumption power of a circuit that performs data processing. An attacker carries out an attack in a way described below.

(1) The attacker predicts Hamming distance of data that is currently processed based upon the estimated secret key (estimated key).
(2) The attacker calculates a degree of similarity between the measured power consumption and the Hamming distance of data, which currently undergoes an estimated operation.
(3) The attacker determines the estimated key, having the highest degree of similarity to the plural power consumption values, as a right key.

Figure 1:
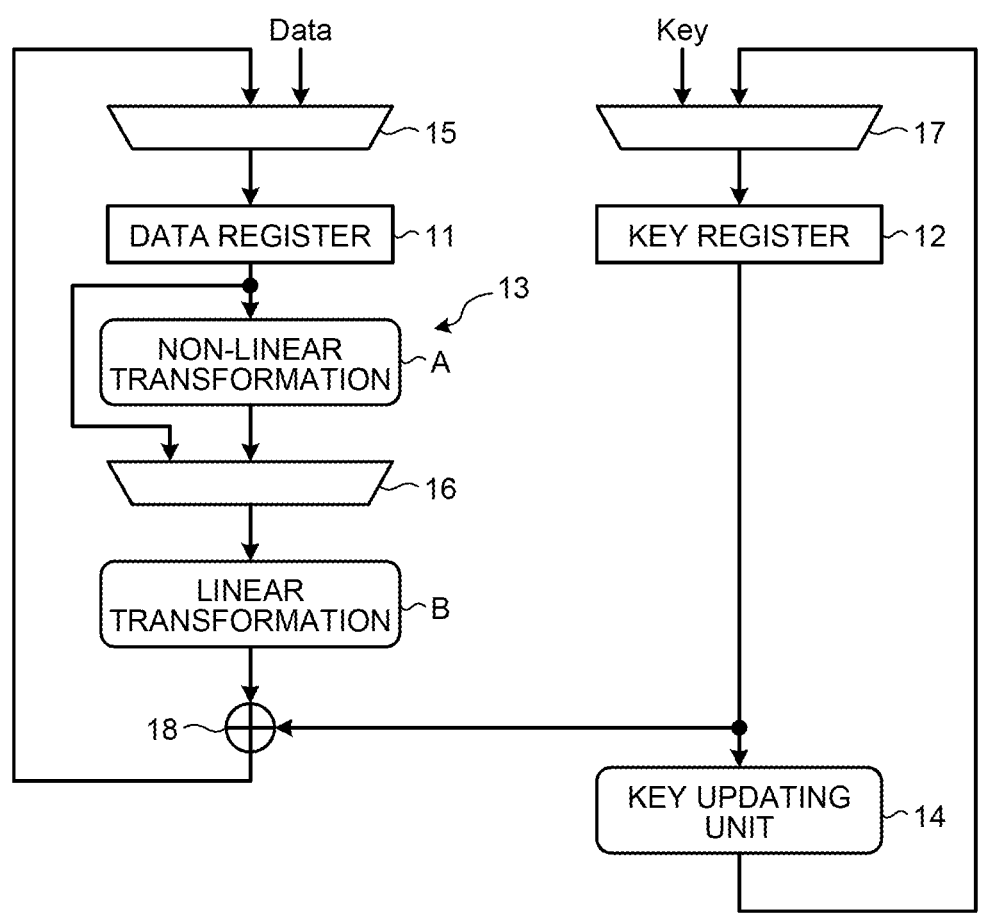
FIG. 1 is a circuit diagram illustrating a model of a general block cipher encryption processing apparatus.

FIG. 1 is a circuit diagram illustrating a model of a general block cipher encryption processing apparatus. The encryption processing apparatus inputs data (Data) that is a target to be encrypted or decrypted, and key data (Key) that is a secret key on a predetermined data-block unit basis, and performs an encryption process or decryption process for each data block. The encryption processing apparatus includes a data register 11 storing the data to be processed or intermediate data; a key register 12 storing key data or expanded key; a data scrambling circuit 13; a key updating unit 14 that generates an expanded key for each processing round; selectors 15, 16, and 17; and an exclusive OR circuit 18. A path including the selector 17, the key register 12, and the key updating unit 14 is also referred to as a key schedule unit.

The data scrambling circuit 13 scrambles the data by the combination of a non-linear transformation and a linear transformation. The data scrambled by the data scrambling circuit 13 and subject to exclusive OR with the expanded key is referred to as intermediate data. The encryption processing apparatus repeats the data scrambling and the exclusive OR with the expanded key for the number of specified processing rounds so as to update the intermediate data, thereby performing the encryption or decryption of the data. In the example illustrated in FIG. 1, the data scrambling circuit 13 is modeled as the combination of a non-linear transformation circuit A and a linear transformation circuit B, and is configured to perform a process of (linear transformation)–(non-linear transformation·linear transformation)×(repeat count). The structure of the data scrambling circuit 13 is not limited to the one illustrated in FIG. 1. The data scrambling circuit 13 may only be configured to scramble the data by the combination of the linear transformation and the non-linear transformation.

The side-channel countermeasure according to the present embodiment makes the prediction described in the section (1) impossible by masking the intermediate data, which is currently processed, by the exclusive OR between random numbers and the intermediate data. In general, random numbers are generated by a random number generator provided at the outside of the encryption circuit, and inputted to the encryption circuit.

Figure 2:
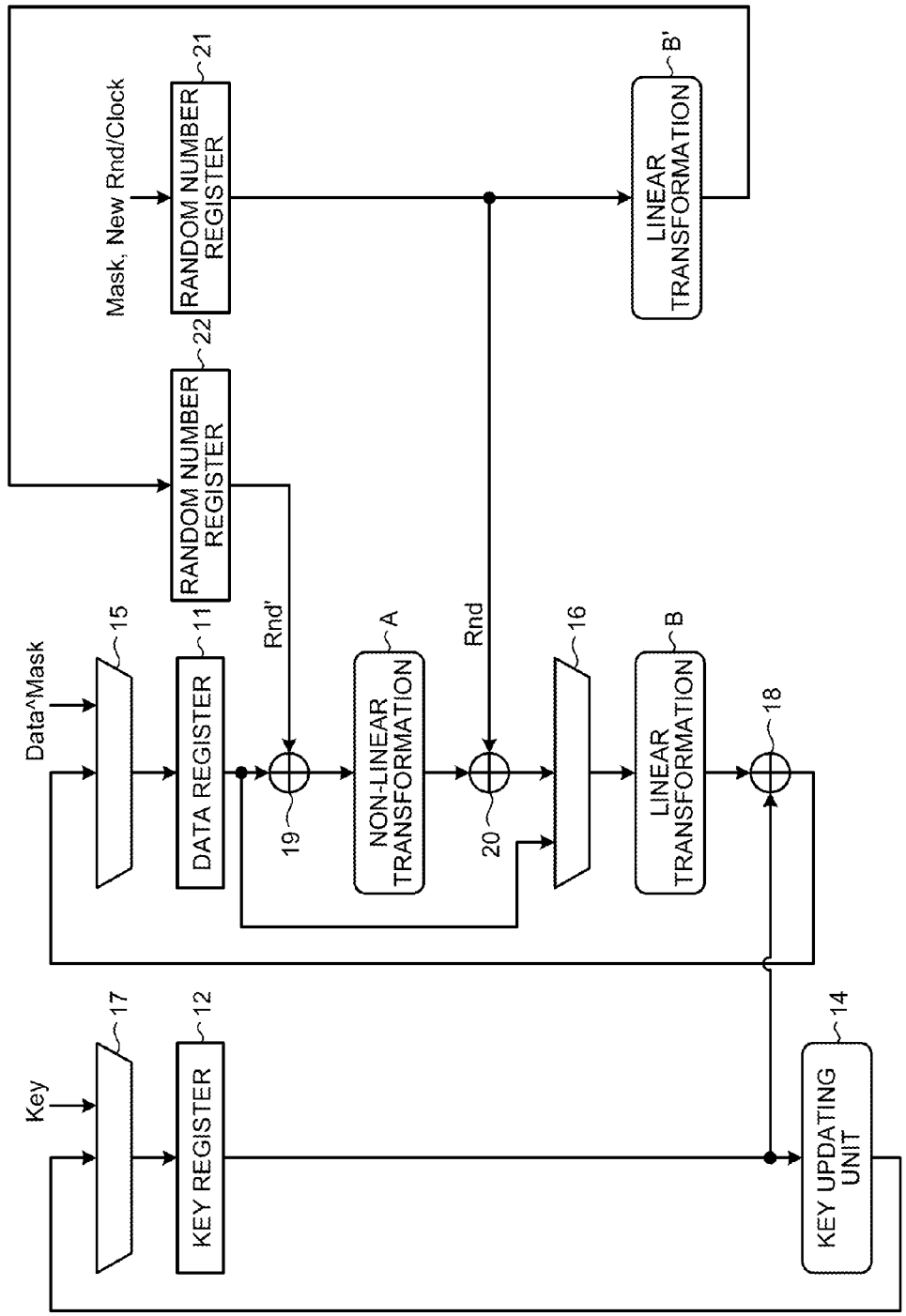
FIG. 2 is a circuit diagram of an encryption processing apparatus having incorporated therein a countermeasure against a side-channel.

FIG. 2 is a view illustrating one example where the side-channel countermeasure described above is incorporated in the general block cipher encryption processing apparatus illustrated in the circuit diagram of FIG. 1. The encryption processing apparatus illustrated in FIG. 2 uses data (Data^Mask), which is preliminarily masked, as input data. This input data is stored in the data register 11 unchanged. A mask value (Mask) that masks the data is also inputted together with the masked data. The inputted mask value is stored in a random number register 21, and used as information for removing the mask from the input data. It is to be noted that A^B means the exclusive OR between data A and data B, and indicates that the data A is masked by the data B. The term "removing the mask" means that the data A is restored from A^B. In the example in FIG. 2, the preliminarily masked data is used as the input data. However, the data that is not masked may be used as the input data, and this input data may be masked before being stored in the data register 11.

In the encryption processing apparatus illustrated in FIG. 2, after the masked data and the mask value are inputted first, random numbers (New Rand) generated by an external random number generator (not illustrated) are inputted to the encryption circuit every 1 clock (Clock) that is a reference for executing 1 round of the encryption process. The random number inputted every 1 clock is stored in the random number register 21. An Rnd' that is a result of the non-linear transformation in a linear transformation circuit B', provided separately from the data scrambling circuit 13, to the random number (the mask value at the beginning) extracted from the random number resister 21 is stored in a random number register 22. The linear transformation circuit B' performs the same linear transformation as that executed by the linear transformation circuit B in the data scrambling circuit 13.

The mask used in the mask method in the side-channel countermeasure is an addition mask formed by the exclusive OR, where the data is masked by using the random numbers. It is to be noted that the addition mask cannot be applied to the non-linear transformation due to operational characteristics. Therefore, it is necessary that the mask is removed before the non-linear transformation, the non-linear transformation is executed to the data to which the mask is not added, and then, the data is masked after the non-linear transformation.

In the example in FIG. 2, an exclusive OR circuit 19 is provided before the non-linear transformation circuit A, and an exclusive OR circuit 20 is provided after the non-linear transformation circuit A. An A(Data) that is an output of the non-linear transformation circuit A is masked by the random number Rnd to form data A(Data)^Rnd, and then, the linear transformation circuit B performs the linear transformation on the A(Data)^Rnd to form B(A(Data)^Rnd). The data register 11 stores the intermediate data B(A(Data)^Rnd)^Key that is the exclusive OR between the masked data B(A(Data)^Rnd) and the expanded key Key. The random number Rnd used for masking the data A(Data) is subject to the linear transformation by the linear transformation circuit B' to form B'(Rnd)=Rnd', and the resultant is stored in the random number register 22.

During the next round, the intermediate data B(A(Data)^Rnd)^Key extracted from the data register 11 is restored to B(A(Data))^Key by using the Rnd' extracted from the random number register 22, and inputted to the non-linear transformation circuit A as being unmasked, where the non-linear transformation is executed. Then, the output from the non-linear transformation circuit A is masked by the random number that is newly inputted from the outside and stored in the random number register 21, and the linear transformation is executed by the linear transformation circuit B. Thereafter, the exclusive OR with the expanded key is carried out, and the resultant is stored in the data register 11. The above-mentioned process is repeated specified number of times of the process round.

In the configuration of FIG. 2, the calculation progresses with the data having a dependency relation with the key being masked by the random number. Therefore, this configuration makes the estimation of the secret key impossible, thereby being capable of invalidating the DPA attack.

As described above, in the conventional encryption processing apparatus having the side-channel countermeasure incorporated therein, the random number used for the mask is inputted from the outside every processing round (1 clock). Specifically, the conventional encryption processing apparatus having the side-channel countermeasure incorporated therein needs a random number generator that generates a new random number for each processing round, in addition to the encryption circuit. Therefore, the circuit scale increases, and the power consumption tends to increase. In view of this, the encryption processing apparatus according to the present embodiment is configured to generate a new mask value (random number) by reusing the mask value of the input data to establish the side-channel countermeasure without an external input of the random number for each processing round, thereby realizing a compact circuit scale and reduction in power consumption.

The random number generator circuit is generally configured to include the linear transformation circuit (scrambling for each bit) and the non-linear transformation circuit. In the present embodiment, the non-linear transformation circuit A in the encryption circuit is employed for the non-linear transformation circuit that occupies most of the circuit scale out of the linear transformation circuit and the non-linear transformation circuit constituting the random number generator circuit. The linear transformation is carried out to the random number for masking the data at the output side of the non-linear transformation circuit A or the linear transformation is carried out to the random number used for removing the mask of the data at the input side of the non-linear transformation circuit A, and then, the non-linear transformation by the non-linear transformation circuit A is carried out to generate a new random number. This random number is reused as the random number for masking the data.

Figure 3:
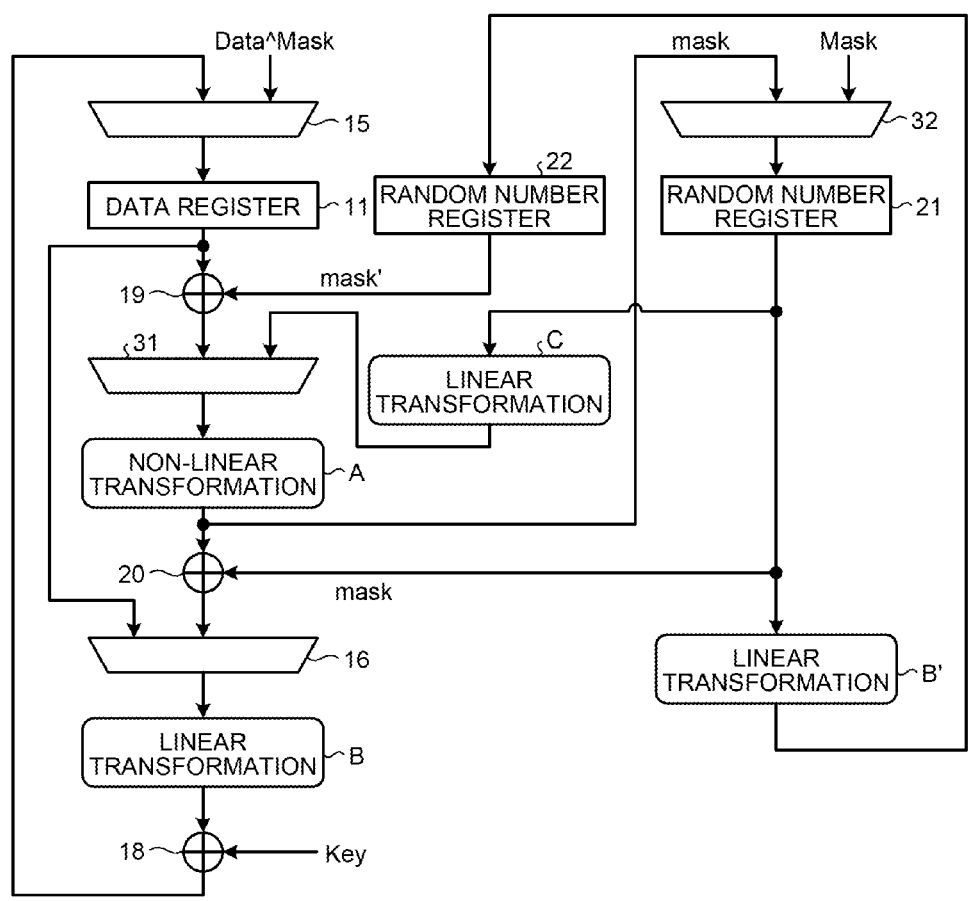
FIG. 3 is a circuit diagram illustrating an outline of the encryption processing apparatus according to an embodiment.

FIG. 3 is a circuit diagram illustrating an outline of the encryption processing apparatus according to the present embodiment. As illustrated in FIG. 3, the encryption processing apparatus according to the present embodiment includes a linear transformation circuit C, and selectors 31 and 32, in addition to the components of the conventional structure illustrated in FIG. 2. The components in the encryption processing apparatus illustrated in FIG. 3 same as those in the conventional structure illustrated in FIG. 2 are denoted by the same numerals. FIG. 3 does not illustrate the key schedule unit. The encryption processing apparatus according to the present embodiment includes the data register 11 (data retaining unit), the random number resister 21 (mask retaining unit), the linear transformation circuit B' (first linear transformation circuit), the linear transformation circuit C (second linear transformation circuit), the exclusive OR circuit 19 (first calculator), the selector 31 (selecting unit), the non-linear transformation circuit A (non-linear transformation unit), the exclusive OR circuit 20 (second calculator), and the linear transformation circuit B (third linear transformation circuit).

As in the conventional structure illustrated in FIG. 2, the masked data (Data^Mask) is inputted to the encryption processing apparatus according to the present embodiment, and its mask value (Mask) is also inputted. The mask value is different depending upon the system to be realized, and is desirably not a fixed value such as a value using a system time or an address where the data is stored. In the conventional structure, this mask value is used only for the mask of the data, and thereafter, the random number generated by the external random number generator circuit is used for each processing round so as to mask the intermediate data. On the other hand, in the present embodiment, the inputted mask value is reused to generate, in the encryption circuit, a new mask value (hereinafter referred to as an intermediate mask (mask)) serving as a new random number for each processing round. The intermediate data is masked by using this intermediate mask.

Figures 4, 5:
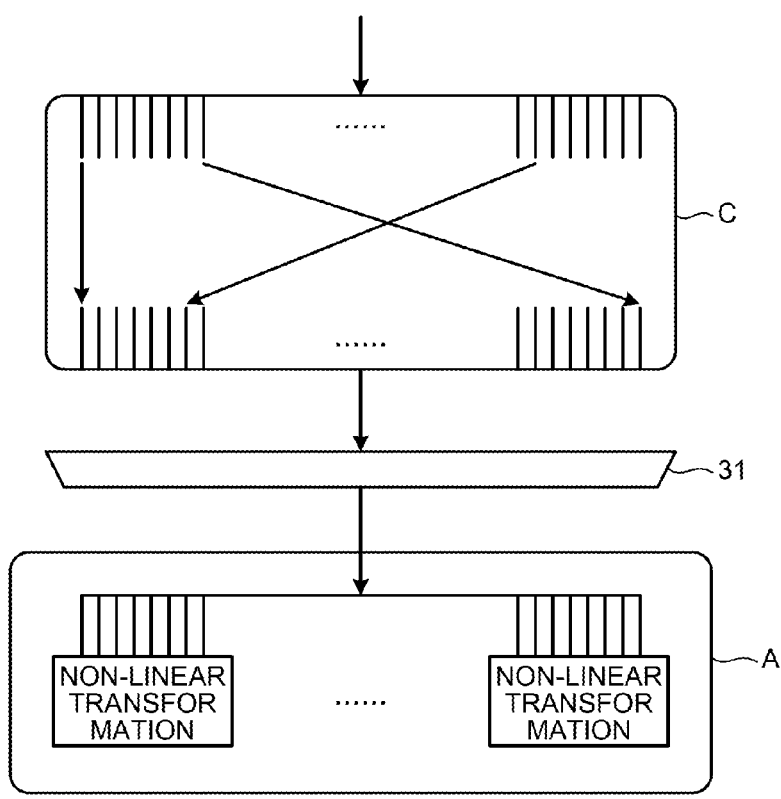
FIG. 4 is a view illustrating one example of a linear transformation circuit according to the embodiment.
FIG. 5 is a view for describing a process of the encryption processing apparatus according to the embodiment.

The linear transformation circuit C is provided in parallel to the linear transformation circuit B' after the random number register 21. The linear transformation circuit C is a linear transformation circuit (linear transformation function) that scrambles the data with a unit shorter than an input/output bit length of the non-linear transformation circuit A determined according to an adapted encryption algorithm. For example, when the encryption algorithm is 128-bit input/output data, and the non-linear transformation circuit A is configured by the non-linear transformation of 16 bits including 8-bit input and 8-bit output, the linear transformation circuit C executes the linear transformation in which data exerts influence on each other in a unit of byte (8-bit unit). Specifically, the linear transformation circuit C is considered to have a structure making a bit shift as illustrated in FIG. 4. The linear transformation circuit C may be configured to perform a constant addition per clock.

The mask value or the intermediate mask extracted from the random number register 21 is inputted to the linear transformation circuit C. The linear transformation circuit C executes the linear transformation described above to the inputted mask value or intermediate mask, and outputs the resultant to the selector 31.

The selector 31 is provided before the non-linear transformation circuit A. It selects the data inputted to the non-linear transformation circuit A from the data that is extracted from the data register 11 and from which the mask is removed, and the mask value or the intermediate mask to which the linear transformation is executed by the linear transformation circuit C.

The selector 32 selects the data to be stored in the random number register 21 from the externally inputted mask value and the intermediate mask that is newly generated inside by reusing this mask value.

In the encryption processing apparatus according to the present embodiment illustrated in FIG. 3, the masked data Data^Mask inputted to the selector 15 is stored in the data register 11, and the mask value Mask inputted to the selector 32 is stored in the random number register 21. The masked data Data^Mask extracted from the data register 11 bypasses the non-linear transformation circuit A to be inputted to the linear transformation circuit B, whereby the linear transformation by the linear transformation circuit B is executed. The intermediate data B(Data^Mask)^Key, which is the exclusive OR of the data B(Data^Mask) on which the linear transformation is executed by the linear transformation circuit B and the expanded key Key generated by the not illustrated key schedule unit, is stored in the data register 11.

On the other hand, the mask value Mask extracted from the random number register 21 is made as B(Mask)=mask' by the linear transformation by the linear transformation circuit B', and the resultant is stored in the random number register 22. The linear transformation by the linear transformation circuit C and the non-linear transformation by the non-linear transformation circuit A are performed to the mask value Mask extracted from the random number register 21, whereby the intermediate mask mask=A(C(Mask)) that is a new random number is generated. The generated intermediate mask mask is stored in the random number register 21.

Next, the mask Mask of the intermediate data B(Data^Mask)^Key is removed by the exclusive OR of the intermediate data B(Data^Mask)^Key extracted from the data register 11 and the mask' extracted from the random number resister 22, whereby the intermediate data B(Data)^Key is restored. After the non-linear transformation circuit A executes the non-linear transformation to the intermediate data B(Data)^Key, the intermediate data is masked by the exclusive OR of the intermediate mask mask extracted from the random number register 22. Then, the resultant data undergoes the linear transformation by the linear transformation circuit B and the exclusive OR with the expanded key Key, and the intermediate data B((Data^mask)^Key masked by the intermediate mask mask is stored in the data register 11.

FIG. 5 is a view for describing the process of the encryption processing apparatus according to the present embodiment, where the data stored in the data register 11, the random number register 21, and the random number register 22 is illustrated for each clock (Clock) that is the reference of the processing round. FIG. 5 illustrates Clocks 1 to 4. However, the process corresponding to the number of clocks corresponding to the specified number of processing round determined according to an encryption algorithm to be adapted is executed.

In the encryption processing apparatus in the present embodiment, in the case of Clock=1, the data register 11 stores the masked data Data^Mask, while the random number register 21 stores the mask value Mask used for the mask of the data as illustrated in FIG. 5.

In the case of Clock=2, the data register 11 stores the intermediate data B(Data^Mask)^Key masked by the mask value Mask, the random number register 22 stores the mask'=B(Mask) that is the result of the linear transformation by the linear transformation circuit B' to the mask value Mask, and the random number register 21 keeps storing the mask value Mask.

In the case of Clock=3, the data register 11 keeps storing the intermediate data B(Data^Mask)^Key masked by the mask value Mask, the random number register 22 keeps storing the mask'=B(Mask) that is the result of the linear transformation by the linear transformation circuit B' to the mask value Mask, and the random number register 21 stores the intermediate mask mask=A(C(Mask)) that is generated by performing the linear transformation on the mask value Mask by the linear transformation circuit C and the non-linear transformation to the mask value Mask by the non-linear transformation circuit A.

In the case of Clock=4, the data register 11 stores the intermediate data B(Data^mask)^Key masked by the intermediate mask mask, the random number register 22 stores the mask'=B(mask) that is the result of the linear transformation to the intermediate mask mask by the linear transformation circuit B', and the random number register 21 keeps storing the intermediate mask mask.

As described above, in the encryption processing apparatus according to the present embodiment, the data stored in the data register 11 is always masked by the mask value (Mask) used for the mask of the data or the intermediate mask (mask) generated by reusing the mask value. Accordingly, the encryption processing apparatus according to the present embodiment makes the estimation of the secret key impossible, thereby being capable of invalidating the DPA attack, as in the conventional structure illustrated in FIG. 2.

The encryption processing apparatus according to the present invention described above generates the intermediate mask (mask) by reusing the mask value (Mask) used for the mask of the data, and masks the intermediate data by using this intermediate mask (mask). Therefore, it is unnecessary to input the random number generated in the random number generator circuit that is provided at the outside of the encryption circuit for each processing round. Specifically, the random number generator circuit does not have to be mounted in addition to the encryption circuit. The non-linear transformation circuit A in the encryption circuit is used for the generation of the intermediate mask (mask). Accordingly, the encryption processing apparatus according to the present embodiment can reduce the circuit scale, and reduce the power consumption.

Figure 6:
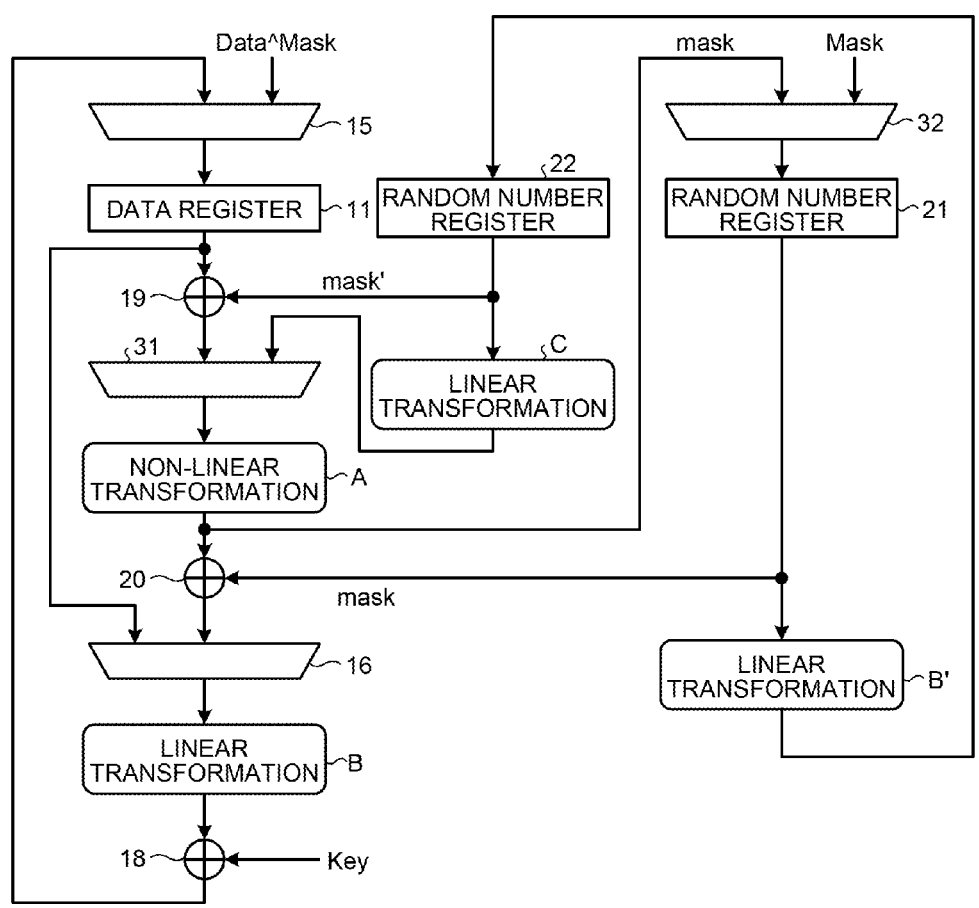
FIG. 6 is a circuit diagram illustrating a modification of the encryption processing apparatus according to the embodiment.

The encryption processing apparatus according to the present embodiment is configured to generate a new intermediate mask (mask) through the linear transformation by the linear transformation circuit C and the non-linear transformation by the non-linear transformation circuit A to the mask value (Mask) or the intermediate mask (mask) extracted from the random number register 21. However, as illustrated in FIG. 6, it may be configured to generate a new intermediate mask (mask) by executing the linear transformation by the linear transformation circuit C and the non-linear transformation by the non-linear transformation circuit A to the mask' extracted from the random number register 22.

The encryption processing apparatus according to the present invention described above uses the non-linear transformation circuit A for the non-linear transformation for generating the intermediate mask (mask). However, since the key updating unit 14 (see FIG. 2) that generates the expanded key in the key schedule unit includes the non-linear transformation circuit, the intermediate mask (mask) may be generated by using the non-linear transformation circuit in the key updating unit 14 instead of or together with the non-linear transformation circuit A.

EXAMPLES

Examples will be described below, where the present invention is applied to an AES encryption processing apparatus employing AES (Advance Encryption Standard) as a block cipher.

The AES encryption processing apparatus includes, as a computing unit used in the encryption process, an Add Round Key (hereinafter referred to as "ARK") that performs the exclusive OR between the expanded key generated in the key schedule unit and the data, a Substitution Bytes (hereinafter referred to as "SB") that performs the non-linear transformation in 8-bit unit, a Shift Rows (hereinafter referred to as "SR") that performs a byte-based data shift, and a Mix Columns (hereinafter referred to as "MC") that performs the linear transformation that exerts influence on 8-bit data in 32 bits.

AES encryption processing apparatus also includes, as a computing unit used in the decryption process, an Inverse Substitution Bytes (hereinafter referred to as "IS") that is an inverse transformation of the SB, an Inverse Shift Rows (hereinafter referred to as "ISR") that is the inverse transformation of the SR, and an Inverse Mix Columns (hereinafter referred to as "IMC") that is the inverse transformation of the MC. The ARK is the exclusive OR, so that it is used in both the decryption process and the encryption process, and it carries out the same computation.

Figure 7:
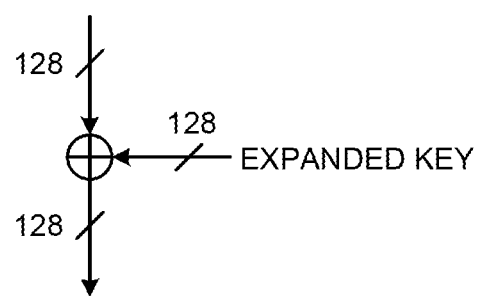
FIG. 7 is a view illustrating an example of a structure of an ARK.

FIG. 7 is a view illustrating an example of the structure of the ARK. As illustrated in FIG. 7, the ARK is a computing process for each bit for outputting 128-bit data, which is the exclusive OR of the 128-bit expanded key and the 128-bit input data.

Figure 8:
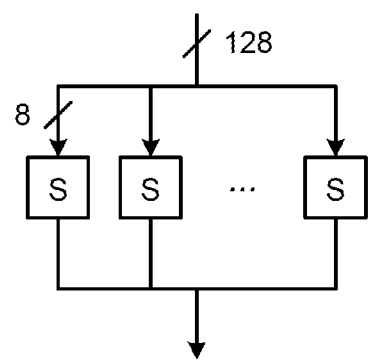
FIG. 8 is a view illustrating an example of a structure of an S.

FIG. 8 is a view illustrating an example of the structure of the S. As illustrated in FIG. 8, the S is a computing process executed by a non-linear transformation table S, where 128-bit input data is divided into 16 8-bit data. The IS is a computing process that is the inverse transformation of the S in FIG. 8 and is executed by a non-linear transformation table IS.

Figure 9:
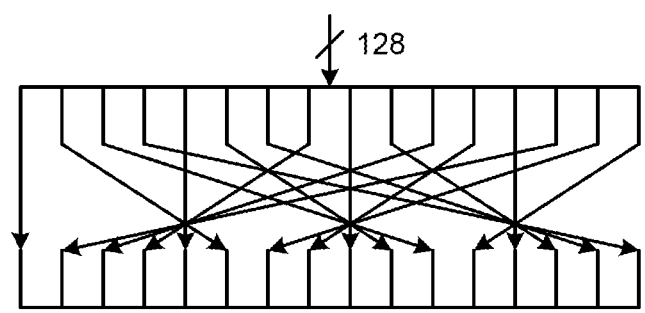
FIG. 9 is a view illustrating an example of a structure of an SR.

FIG. 9 is a view illustrating an example of the structure of the SR. As illustrated in FIG. 9, the SR divides the 128-bit input data into 16 8-bit data, and rearranges these 16 8-bit data. FIG. 9 illustrates the case in which each of 8-bit data, which is obtained by dividing the input data, is rearranged on the position indicated by an arrow. The ISR performs the input data rearranging process that is the inverse transformation of the SR illustrated in FIG. 9.

Figure 10:
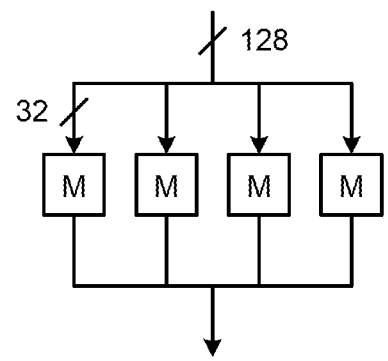
FIG. 10 is a view illustrating an example of a structure of an MC.

FIG. 10 is a view illustrating an example of the structure of the MC. As illustrated in FIG. 10, the MC is a computing process in which the 128-bit data is divided into 4 32-bit data, and the linear transformation is carried out for each of 4 32-bit data. The INC performs the inverse transformation of the MC in FIG. 10.

First Example

FIG. 11 is a circuit diagram illustrating the encryption processing apparatus according to the first example. The encryption processing apparatus according to the first example is configured to input and output 128-bit data, and includes a data processing unit 100, a mask processing unit 200, and a key schedule unit 300.

The data processing unit 100 includes a selector 101, a data register 102, an exclusive OR circuit 103, a selector 104, a selector 105, an S 106, an IS 107, a selector 108, an exclusive OR circuit 109, an ARK 110, a selector 111, an MC/IMC 112, a selector 113, an ARK 114, a selector 115, an SR 116, an ISR 117, and a selector 118, as illustrated in FIG. 11.

The selector 101 corresponds to the selector 15 in FIG. 3. The data register 102 corresponds to the data register 11 in FIG. 3. The exclusive OR circuit 103 corresponds to the exclusive OR circuit 19 in FIG. 3. The selectors 104 and 105 correspond to the selector 31 in FIG. 3. The S 106 and the IS 107 correspond to the non-linear transformation circuit A in FIG. 3. The exclusive OR circuit 109 corresponds to the exclusive OR circuit 20 in FIG. 3. The selector 113 corresponds to the selector 16 in FIG. 3. The MC/IMC 112, the SR 116, and the ISR 117 correspond to the linear transformation circuit B in FIG. 3. The ARK 114 and the ARK 110 correspond to the exclusive OR circuit 18 in FIG. 3.

The mask processing unit 200 includes a selector 201, a random number register 202, a linear transformation circuit C, a selector 203, an MC/IMC 204, a selector 205, an SR 206, an ISR 207, a selector 208, and a random number register 209, as illustrated in FIG. 11.

The selector 201 corresponds to the selector 32 in FIG. 3. The random number register 202 corresponds to the random number register 21 in FIG. 3. The linear transformation circuit C corresponds to the linear transformation circuit C in FIG. 3. The MC/INC 204, the SR 206, and the ISR 207 correspond to the linear transformation circuit B' in FIG. 3. The random number register 209 corresponds to the random number register 22 in FIG. 3.

As illustrated in FIG. 11, the key schedule unit 300 includes a selector 301, a key register 302, and a key updating unit 303. The key updating unit 303 includes a transformation circuit that performs an F transformation (composed of the non-linear transformation and constant addition) on the least significant 32 bits (4 bytes) of the 128-bit key data divided into 32-bit unit data, and an exclusive OR circuit. The key schedule unit 300 generates the expanded key for each clock by the F transformation by the transformation circuit and the exclusive OR, and inputs the resultant to the ARK 114 or the ARK 110 in the data processing unit 100.

In the encryption processing apparatus according to the first example, the masked 128-bit data (Data^Mask) is inputted to the selector 101, and stored in the data register 102. The 128-bit mask value (Mask) used for the mask of the data is inputted to the selector 201, and stored in the random number register 202. 128-bit key data (Key) is inputted to the selector 301, and stored in the key register 302. The encryption process is executed to the masked data (Data^Mask) in the procedure described below.

On the first clock, the data is flown through a path of ARK 114→SR 116, and its result is stored in the data register 102. In this case, the expanded key used in the ARK 114 is generated by using the key data that is the secret key by the key schedule unit 300.

From the second clock to the tenth clock, the intermediate data is flown through a path of S 106→MC/IMC 112→ARK 114→SR 116, and its result is stored in the data register 102. In this case, the mask of the intermediate data is removed by the exclusive OR circuit 103 before the S 106, and the intermediate data is masked by the intermediate mask by the exclusive OR circuit 109 after the S 106. The intermediate mask used for the mask of the intermediate data is generated in such a manner that the linear transformation circuit C performs the linear transformation on the mask value or the intermediate mask extracted from the random number register 202, and then, the IS 107 that is not used for the encryption process performs the non-linear transformation. The data for removing the mask of the intermediate data is generated such that the mask value or the intermediate mask extracted from the random number register 202 flows through the path of MC/IMC 204→SR 206. The generated data is stored in the random number register 209. The expanded key used in the ARK 114 is generated by using the key data that is the secret key by the key schedule unit 300. The expanded key has a different value for each clock.

Finally, on the eleventh clock, the intermediate data is flown through the path of S 106→ARK 110, and its result is stored in the data register 102 as an encrypted text. In this case too, the mask of the intermediate data is removed by the exclusive OR circuit 103 before the S 106, and the intermediate data is masked by the intermediate mask in the exclusive OR circuit 109 after the S 106. The expanded key used in the ARK 110 is generated by using the key data that is the secret key by the key schedule unit 300.

The decryption process for decrypting the encrypted text is executed in the procedure described below.

On the first clock, the encrypted text is flown through a path of ARK 114→ISR 117, and its result is stored in the data register 102. In this case, the expanded key used in the ARK 114 is generated by using the key data that is the secret key by the key schedule unit 300.

From the second clock to the tenth clock, the intermediate data is flown through a path of IS 107→ARK 110→MC/IMC 112→ISR 117, and its result is stored in the data register 102. In this case, the mask of the intermediate data is removed by the exclusive OR circuit 103 before the IS 107, and the intermediate data is masked by the intermediate data by the exclusive OR circuit 109 after the IS 107. The intermediate mask used for the mask of the intermediate data is generated in such a manner that the linear transformation circuit C performs the linear transformation on the mask value or the intermediate mask extracted from the random number register 202, and then, the S 106 that is not used for the decryption process performs the non-linear transformation. The data for removing the mask of the intermediate mask is generated such that the mask value or the intermediate mask extracted from the random number register 202 flows through the path of MC/IMC 204→ISR 207. The generated data is stored in the random number register 209. The expanded key used in the ARK 110 is generated by using the key data that is the secret key by the key schedule unit 300. The expanded key has a different value for each clock.

Finally, on the eleventh clock, the intermediate data is flown through the path of IS 107→ARK 110, and its result is stored in the data register 102 as a plaintext. In this case too, the mask of the intermediate data is removed by the exclusive OR circuit 103 before the IS 107, and the intermediate data is masked by the intermediate mask in the exclusive OR circuit 109 after the IS 107. The expanded key used in the ARK 110 is generated by using the key data that is the secret key by the key schedule unit 300.

FIG. 12 is a view for describing the encryption process by the encryption processing apparatus according to the first example, where the data stored in the data register 102, the random number register 202, and the random number register 209, and the process executed to the data stored in the data register 102 are illustrated for each clock (Clock) that is the reference of the processing round.

As illustrated in FIG. 12, in the encryption processing apparatus according to the first example, the masked data Data^Mask is stored in the data register 102, and the mask value Mask used for the mask of the data is stored in the random number register 202, in the case of Clock=0. Then, the masked data Data^Mask is extracted from the data register 102, the ARK 114 and the SR 116 perform computation respectively, and the intermediate data data1=SR(Data-^Mask^Key0) that is the result of the computation is stored in the data register 102. The mask value Mask is extracted from the random number register 202, the SR 206 performs computation, and the data that is the result of the computation, i.e., the data Mask'=SR(Mask) for removing the mask Mask from the intermediate data data1, is stored in the random number register 209. The linear transformation circuit C performs the linear transformation, and the IS 107 performs the non-linear transformation, on the mask value Mask extracted from the random number register 202, and the intermediate mask mask1=IS(C(Mask)) that is the result is stored in the random number register 202.

In the case of Clock=1, the intermediate data data1 is stored in the data register 102, the random number register 202 stores the intermediate mask mask1, and the random number register 209 stores the data Mask' for removing the mask Mask. The intermediate data data1 is extracted from the data register 102, the data Mask' for removing the mask Mask is extracted from the random number register 209, and the intermediate mask mask1 is extracted from the random number register 202. The computation by the S 106, the computation of the MC by the MC/IMC 112, the computation by the ARK 114, and the computation by the SR 116 are performed on the intermediate data data1 extracted from the data register 102, and the intermediate data data2=SR(MC(S(data1^Mask')^mask1)^key1) that is the result of the computation is stored in the data register 102. In this case, the mask is exchanged before or after the S 106 to the intermediate data data1 by using the data Mask' for removing the mask Mask extracted from the random number register 209 and the intermediate mask mask1 extracted from the random number register 202. The computation of the MC by the MC/IMC 204, and the computation by the SR 206 are performed on the intermediate mask mask1 extracted from the random number register 202. Then, the data that is the result of the computation, i.e., the data Mask1'=SR(MC(mask1)) for removing the intermediate mask mask1 from the intermediate data data2, is stored in the random number register 209, and the linear transformation by the linear transformation circuit C and the non-linear transformation by the IS 107 are performed, whereby the resultant intermediate mask mask2=IS(C(mask1)) is stored in the random number register 202.

In the case of Clock=2, the intermediate data data2 is stored in the data register 102, the random number register 202 stores the intermediate mask mask2, and the random number register 209 stores the data Mask1' for removing the intermediate mask mask1. The intermediate data data2 is extracted from the data register 102, the data Mask1' for removing the intermediate mask mask1 is extracted from the random number register 209, and the intermediate mask mask2 is extracted from the random number register 202. The computation by the S 106, the computation of the MC by the MC/IMC 112, the computation by the ARK 114, and the computation by the SR 116 are performed on the intermediate data data2 extracted from the data register 102, and the intermediate data data3=SR(MC(S(data2^Mask1')^mask2)^key2) that is the result of the computation is stored in the data register 102. In this case, the mask is exchanged before or after the S 106 to the intermediate data data2 by using the data Mask1' for removing the intermediate mask mask1 extracted from the random number register 209 and the intermediate mask mask2 extracted from the random number register 202. The computation of the MC by the MC/IMC 204, and the computation by the SR 206 are performed on the intermediate mask mask2 extracted from the random number register 202. Then, the data that is the result of the computation, i.e., the data Mask2'=SR(MC(mask2)) for removing the intermediate mask mask2 from the intermediate data data3, is stored in the random number register 209, and the linear transformation by the linear transformation circuit C and the non-linear transformation by the IS 107 are performed, whereby the resultant intermediate mask mask3=IS(C(mask2)) is stored in the random number register 202.

In the case of Clock=3, the intermediate data data3 is stored in the data register 102, the random number register 202 stores the intermediate mask mask3, and the random number register 209 stores the data Mask2' for removing the intermediate mask mask2. The intermediate data data3 is extracted from the data register 102, the data Mask2' for removing the intermediate mask mask2 is extracted from the random number register 209, and the intermediate mask mask3 is extracted from the random number register 202. The computation by the S 106, the computation of the MC by the MC/IMC 112, the computation by the ARK 114, and the computation by the SR 116 are performed on the intermediate data data3 extracted from the data register 102, and the intermediate data data4=SR(MC(S(data3^Mask2')^mask3)^key3) that is the result of the computation is stored in the data register 102. In this case, the mask is exchanged before or after the S 106 to the intermediate data data3 by using the data Mask2' for removing the intermediate mask mask2 extracted from the random number register 209 and the intermediate mask mask3 extracted from the random number register 202. The computation of the MC by the MC/INC 204, and the computation by the SR 206 are performed on the intermediate mask mask3 extracted from the random number register 202. Then, the data that is the result of the computation, i.e., the data Mask3'=SR(MC(mask3)) for removing the intermediate mask mask3 from the intermediate data data4, is stored in the random number register 209, and the linear transformation by the linear transformation circuit C and the non-linear transformation by the IS 107 are performed, whereby the resultant intermediate mask mask4=IS(C(mask3)) is stored in the random number register 202.

In the case of Clock=4, the intermediate data data4 is stored in the data register 102, the random number register 202 stores the intermediate mask mask4, and the random number register 209 stores the data Mask3' for removing the intermediate mask mask3. The intermediate data data4 is extracted from the data register 102, the data Mask3' for removing the intermediate mask mask3 is extracted from the random number register 209, and the intermediate mask mask4 is extracted from the random number register 202. The computation by the S 106, the computation of the MC by the MC/IMC 112, the computation by the ARK 114, and the computation by the SR 116 are performed on the intermediate data data4 extracted from the data register 102, and the intermediate data data5=SR(MC(S(data4^Mask3')^mask4)^key4) that is the result of the computation is stored in the data register 102. In this case, the mask is exchanged before or after the S 106 to the intermediate data data4 by using the data Mask3' for removing the intermediate mask mask3 extracted from the random number register 209 and the intermediate mask mask4 extracted from the random number register 202. The computation of the MC by the MC/IMC 204, and the computation by the SR 206 are performed on the intermediate mask mask4 extracted from the random number register 202. Then, the data that is the result of the computation, i.e., the data Mask4'=SR(MC(mask4)) for removing the intermediate mask mask4 from the intermediate data data5, is stored in the random number register 209, and the linear transformation by the linear transformation circuit C and the non-linear transformation by the IS 107 are performed, whereby the resultant intermediate mask mask5=IS(C(mask4)) that is the result is stored in the random number register 202.

In the case of Clock=5, the intermediate data data5 is stored in the data register 102, the random number register 202 stores the intermediate mask mask5, and the random number register 209 stores the data Mask4' for removing the intermediate mask mask4. The intermediate data data5 is extracted from the data register 102, the data Mask4' for removing the intermediate mask mask4 is extracted from the random number register 209, and the intermediate mask mask5 is extracted from the random number register 202. The computation by the S 106, the computation of the MC by the MC/IMC 112, the computation by the ARK 114, and the computation by the SR 116 are performed on the intermediate data data5 extracted from the data register 102, and the intermediate data data6=SR(MC(S(data5^Mask4')^mask5)^key5) that is the result of the computation is stored in the data register 102. In this case, the mask is exchanged before or after the S 106 to the intermediate data data5 by using the data Mask4' for removing the intermediate mask mask4 extracted from the random number register 209 and the intermediate mask mask5 extracted from the random number register 202. The computation of the MC by the MC/IMC 204, and the computation by the SR 206 are performed on the intermediate mask mask5 extracted from the random number register 202. Then, the data that is the result of the computation, i.e., the data Mask5'=SR(MC(mask5)) for removing the intermediate mask mask5 from the intermediate data data6, is stored in the random number register 209, and the linear transformation by the linear transformation circuit C and the non-linear transformation by the IS 107 are performed, whereby the resultant intermediate mask mask6=IS(C(mask5)) is stored in the random number register 202.

In the case of Clock=6, the intermediate data data6 is stored in the data register 102, the random number register 202 stores the intermediate mask mask6, and the random number register 209 stores the data Mask5' for removing the intermediate mask mask5. The intermediate data data6 is extracted from the data register 102, the data Mask5' for removing the intermediate mask mask5 is extracted from the random number register 209, and the intermediate mask mask6 is extracted from the random number register 202. The computation by the S 106, the computation of the MC by the MC/IMC 112, the computation by the ARK 114, and the computation by the SR 116 are performed on the intermediate data data6 extracted from the data register 102, and the intermediate data data?=SR(MC(S(data6^Mask5')^mask6)^key6) that is the result of the computation is stored in the data register 102. In this case, the mask is exchanged before or after the S 106 to the intermediate data data6 by using the data Mask5' for removing the intermediate mask mask5 extracted from the random number register 209 and the intermediate mask mask6 extracted from the random number register 202. The computation of the MC by the MC/IMC 204, and the computation by the SR 206 are performed on the intermediate mask mask6 extracted from the random number register 202. Then, the data that is the result of the computation, i.e., the data Mask6'=SR(MC(mask6)) for removing the intermediate mask mask6 from the intermediate data data7, is stored in the random number register 209, and the linear transformation by the linear transformation circuit C and the non-linear transformation by the IS 107 are performed, whereby the resultant intermediate mask mask7=IS(C(mask6)) is stored in the random number register 202.

In the case of Clock=7, the intermediate data data7 is stored in the data register 102, the random number register 202 stores the intermediate mask mask7, and the random number register 209 stores the data Mask6' for removing the intermediate mask mask6. The intermediate data data7 is extracted from the data register 102, the data Mask6' for removing the intermediate mask mask6 is extracted from the random number register 209, and the intermediate mask mask7 is extracted from the random number register 202. The computation by the S 106, the computation of the MC by the MC/IMC 112, the computation by the ARK 114, and the computation by the SR 116 are performed on the intermediate data data7 extracted from the data register 102, and the intermediate data data8=SR(MC(S(data7^Mask6')^mask7)^key7) that is the result of the computation is stored in the data register 102. In this case, the mask is exchanged before or after the S 106 to the intermediate data data7 by using the data Mask6' for removing the intermediate mask mask6 extracted from the random number register 209 and the intermediate mask mask7 extracted from the random number register 202. The computation of the MC by the MC/IMC 204, and the computation by the SR 206 are performed on the intermediate mask mask7 extracted from the random number register 202. Then, the data that is the result of the computation, i.e., the data Mask7'=SR(MC(mask7)) for removing the intermediate mask mask7 from the intermediate data data8, is stored in the random number register 209, and the linear transformation by the linear transformation circuit C and the non-linear transformation by the IS 107 are performed, whereby the resultant intermediate mask mask8=IS(C(mask7)) is stored in the random number register 202.

In the case of Clock=8, the intermediate data data8 is stored in the data register 102, the random number register 202 stores the intermediate mask mask8, and the random number register 209 stores the data Mask7' for removing the intermediate mask mask7. The intermediate data data8 is extracted from the data register 102, the data Mask7' for removing the intermediate mask mask7 is extracted from the random number register 209, and the intermediate mask mask8 is extracted from the random number register 202. The computation by the S 106, the computation of the MC by the MC/IMC 112, the computation by the ARK 114, and the computation by the SR 116 are performed on the intermediate data data8 extracted from the data register 102, and the intermediate data data9=SR(MC(S(data8^Mask7')^mask8)^key8) that is the result of the computation is stored in the data register 102. In this case, the mask is exchanged before or after the S 106 to the intermediate data data8 by using the data Mask7' for removing the intermediate mask mask7 extracted from the random number register 209 and the intermediate mask mask8 extracted from the random number register 202. The computation of the MC by the MC/INC 204, and the computation by the SR 206 are performed on the intermediate mask mask8 extracted from the random number register 202. Then, the data that is the result of the computation, i.e., the data Mask8'=SR(MC(mask8)) for removing the intermediate mask mask8 from the intermediate data data9, is stored in the random number register 209, and the linear transformation by the linear transformation circuit C and the non-linear transformation by the IS 107 are performed, whereby the resultant intermediate mask mask9=IS(C(mask8)) is stored in the random number register 202.

In the case of Clock=9, the intermediate data data9 is stored in the data register 102, the random number register 202 stores the intermediate mask mask9, and the random number register 209 stores the data Mask8' for removing the intermediate mask mask8. The intermediate data data9 is extracted from the data register 102, the data Mask8' for removing the intermediate mask mask8 is extracted from the random number register 209, and the intermediate mask mask9 is extracted from the random number register 202. The computation by the S 106, the computation of the MC by the MC/IMC 112, the computation by the ARK 114, and the computation by the SR 116 are performed on the intermediate data data9 extracted from the data register 102, and the intermediate data data10=SR(MC(S(data9^Mask8')^mask9)^key9) that is the result of the computation is stored in the data register 102. In this case, the mask is exchanged before or after the S 106 to the intermediate data data9 by using the data Mask8' for removing the intermediate mask mask8 extracted from the random number register 209 and the intermediate mask mask9 extracted from the random number register 202. The computation of the MC by the MC/IMC 204, and the computation by the SR 206 are performed on the intermediate mask mask9 extracted from the random number register 202. Then, the data that is the result of the computation, i.e., the data Mask9'=SR(MC(mask9)) for removing the intermediate mask mask9 from the intermediate data data10, is stored in the random number register 209, and the linear transformation by the linear transformation circuit C and the non-linear transformation by the IS 107 are performed, whereby the resultant intermediate mask mask10=IS(C(mask9)) is stored in the random number register 202.

In the case of Clock=10, the intermediate data data10 is stored in the data register 102, the random number register 202 stores the intermediate mask mask10, and the random number register 209 stores the data Mask9' for removing the intermediate mask mask9. The intermediate data data10 is extracted from the data register 102, the data Mask9' for removing the intermediate mask mask9 is extracted from the random number register 209, and the intermediate mask mask10 is extracted from the random number register 202. The computation by the S 106, and the computation by the ARK 110 are performed on the intermediate data data10 extracted from the data register 102, and the intermediate data data11=(S(data10^Mask9')^mask10)^key10) that is the result of the computation is stored in the data register 102. In this case, the mask is exchanged before or after the S 106 to the intermediate data data10 by using the data Mask9' for removing the intermediate mask mask9 extracted from the random number register 209 and the intermediate mask mask10 extracted from the random number register 202.

As described above, in the encryption processing apparatus according to the first example, the data stored in the data register 102 is always masked by the mask value (mask) or the intermediate mask (mask), whereby the estimation of the secret key becomes impossible, which invalidates the DPA attack. The intermediate mask is generated by reusing the mask value with the S 106 or the IS 107 in the encryption circuit being employed. Therefore, it is unnecessary to mount a random number generator circuit in addition to the encryption circuit, whereby the circuit scale can be made compact, and the reduction in the power consumption can be realized.

In the encryption processing apparatus according to the first example, the intermediate mask is generated by using the IS 107 that is not used for the encryption in the encryption process, and the intermediate mask is generated by using the S 106 that is not used for decrypting in the decryption process. Therefore, the computation for the encryption or decryption and the generation of the intermediate mask can be carried out on the same clock, which can prevent the increase in the latency.

Second Example

Figure 13:
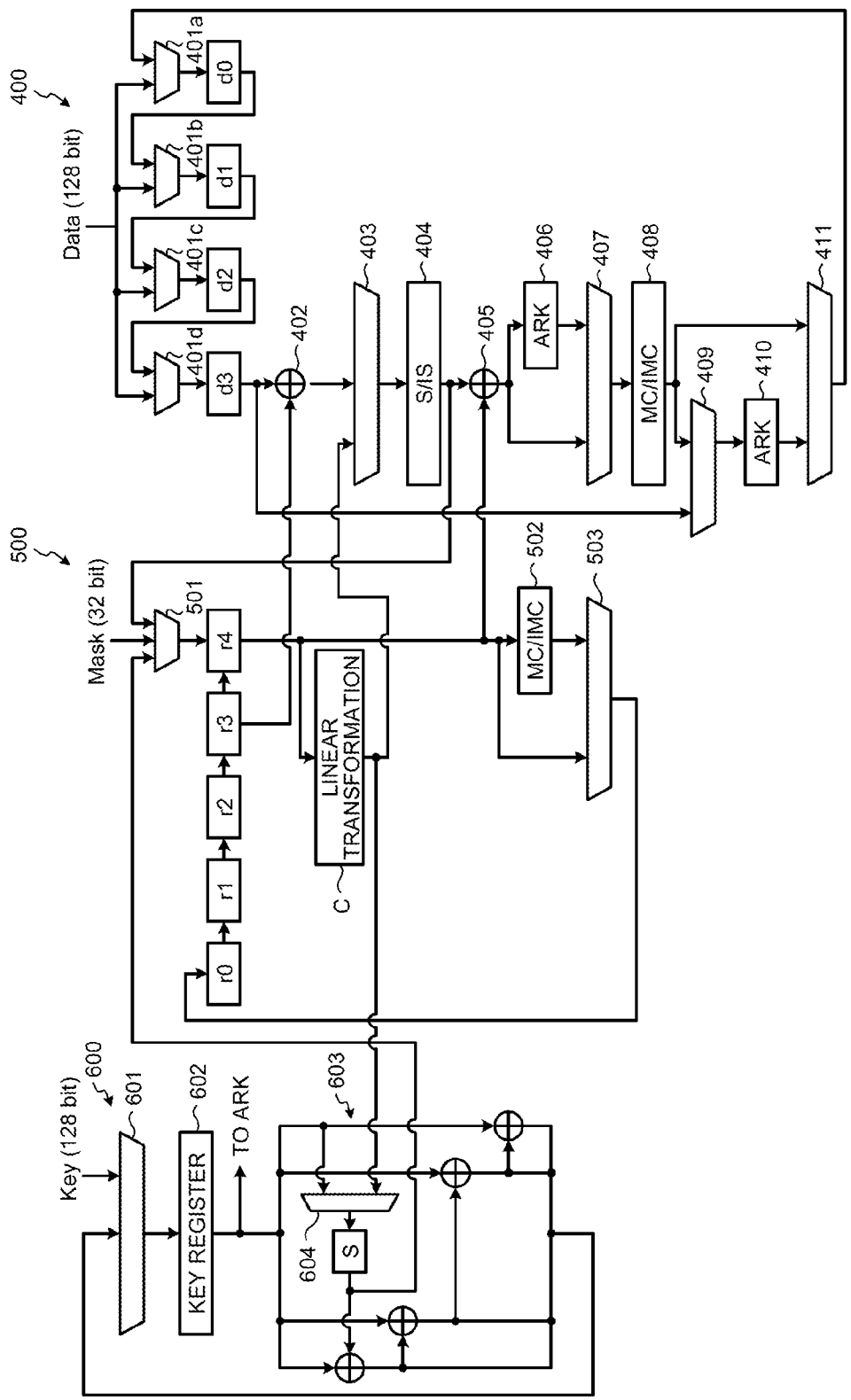
FIG. 13 is a circuit diagram illustrating an encryption processing apparatus according to a second example.

The second example is an example of application of the present invention to an encryption processing apparatus for reducing the circuit scale through a sequential process per 32-bit data of 128-bit data block. FIG. 13 is a circuit diagram illustrating the encryption processing apparatus according to the second example. The encryption processing apparatus according to the second example includes a data processing unit 400, a mask processing unit 500, and a key schedule unit 600.

The data processing unit 400 includes selectors 401a to 401d, data registers d0 to d3, an exclusive OR circuit 402, a selector 403, an S/IS 404, an exclusive OR circuit 405, an ARK 406, a selector 407, an MC/IMC 408, a selector 409, an ARK 410, and a selector 411, as illustrated in FIG. 13. The SR and ISR are byte-based substitution operations executed on the same clock for the whole 128-bit data block, and they are only represented by selectors. Therefore, they are not illustrated in FIG. 13.

Figure 14:
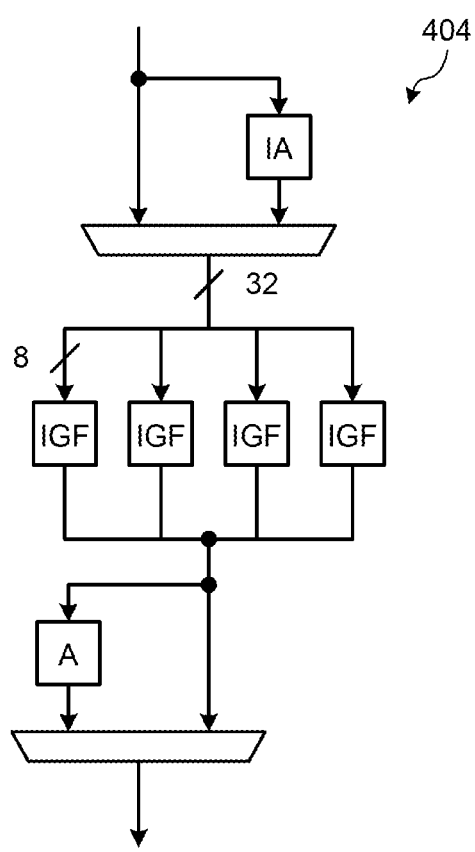
FIG. 14 is a view illustrating an example of a structure of an S/IS.

S/IS 404 is a circuit in which the S used for the encryption and the IS used for the decryption are shared. As illustrated in FIG. 14, the S/IS 404 is configured by an inversion IGF that is the non-linear transformation, and affine transformation A and inverse affine transformation IA that are the linear transformation.

The selectors 401a to 401d correspond to the selector 15 in FIG. 3. The data registers d0 to d3 correspond to the register 11 in FIG. 3. The exclusive OR circuit 402 corresponds to the exclusive OR circuit 19 in FIG. 3. The selector 403 corresponds to the selector 31 in FIG. 3. The S/IS 404 corresponds to the non-linear transformation circuit A. The exclusive OR circuit 405 corresponds to the exclusive OR circuit 20 in FIG. 3. The selector 409 corresponds to the selector 16 in FIG. 3. The MC/IMC 408 corresponds to the linear transformation circuit B. The ARK 410 and the ARK 406 correspond to the exclusive OR circuit 18 in FIG. 3.

The mask processing unit 500 includes a selector 501, random number registers r0 to r4, linear transformation circuit C, an MC/IMO 502, and selector 503 as illustrated in FIG. 13. The SR and ISR are byte-based substitution operations executed on the same clock for the 128-bit mask, and they are represented only by selectors. Therefore, they are not illustrated in FIG. 13.

The selector 501 corresponds to the selector 32 in FIG. 3. The random number register r4 corresponds to the random number register 21 in FIG. 3. The random number registers r0 to r3 correspond to the random number register 22 in FIG. 3. The linear transformation circuit C corresponds to the linear transformation circuit C in FIG. 3. The MC/IMC 502 corresponds to the linear transformation circuit B' in FIG. 3.

As illustrated in FIG. 13, the key schedule unit 600 includes a selector 601, a key register 602, and a key updating unit 603. The key updating unit 603 includes a transformation circuit (hereinafter referred to as sbox+α) that includes a 32-bit non-linear transformation S. A selector 604 is mounted before the sbox+α. The key schedule unit 600 generates the expanded key once per 5 clocks, and inputs the resultant to the ARK 410 or the ARK 406 in the data processing unit 400.

In the encryption processing apparatus according to the second example, the 128-bit data (Data) is divided into 32 bits, and the divided data is inputted to the selector 401d, selector 401c, selector 401b, and selector 401a respectively from the most significant 32 bits. The data inputted to the selector 401d is stored in the data register d3, the data inputted to the selector 401c is stored in the data register d2, the data inputted to the selector 401b is stored in the data register d1, and the data inputted to the selector 401a is stored in the data register d0. The 32-bit mask value (Mask) is stored in the selector 501, and stored in the random number register r4. The encryption process is executed to the data (Data) in the procedure described below.

On the first clock, the most significant 32-bit data extracted from the data register d3 flows through the ARK 410, and then, the most significant 32-bit data on which the ARK is performed is stored in the data register d0. In this case, 32-bit data stored in the data register d2, the data register d1, and the data register d0 is stored as being shifted to the data register d3, the data register d2, and the data register d1. From the second clock to the fourth clock, the process same as that for the first clock is executed. The ARK is sequentially executed to the 128-bit data (Data) in a unit of 32 bits. On the next fifth clock, the SR is executed to the whole 128-bit data to which the ARK is performed once.

On the other hand, in the mask processing unit 500, the 32-bit mask value stored in the random number register r4 is stored as being shifted to the random number registers r0 to r3 from the first clock to the fourth clock. On the fifth clock, the linear transformation by the linear transformation circuit C and the non-linear transformation by the S/IS 404 are performed on the mask value extracted from the random number register r4, whereby the intermediate mask is generated and stored in the random number register r4. The SR is performed on the mask value stored in the random number registers r0 to r3, whereby the data for removing the mask is generated.

In the key schedule unit 600, the key data stored in the key register 602 is retained from the first clock to the fourth clock, and on the fifth clock, sbox+α and the exclusive OR are performed on the key data stored in the key register 602, whereby the expanded key is generated.

Next on the sixth clock, the most significant 32-bit intermediate data extracted from the data register r3 flows through the path of S/IS 404→MC/IMC 408→ARK 410, and its result is stored in the data register d0. In this case, the mask of the intermediate data is removed by the data extracted from the random number register r3 by the exclusive OR circuit 402 before the S/IS 404, and the intermediate data is masked by the intermediate mask extracted from the random number register r4 by the exclusive OR circuit 405 after the S/IS 404. The process same as that for the sixth clock is performed in 3 clocks from the seventh clock to the ninth clock, whereby the S, MC, and ARK are sequentially performed in a unit of 32 bits on the 128-bit intermediate data. On the next tenth clock, the SR is performed to the whole 128-bit intermediate data on which the S, MC, and ARK are performed.

On the other hand, in the mask processing unit 500, the linear transformation by the linear transformation circuit C and the non-linear transformation by the sbox+α in the key updating unit 603 are performed on the intermediate mask extracted from the random number register r4 on each of the sixth clock to the ninth clock, whereby a new intermediate mask is generated. The MC is performed by the MC/IMC 502 on the intermediate mask extracted from the random number register r4 on each of the sixth clock to the ninth clock. On the tenth clock, the SR is performed on the whole intermediate mask on which the MC is performed, whereby the data for removing the mask is generated.

In the key schedule unit 600, the key data stored in the key register 602 is retained from the sixth clock to the ninth clock. On the tenth clock, sbox+α and the exclusive OR are performed on the key data stored in the key register 602, whereby a new expanded key is generated.

Thereafter, until the clock corresponding to the processing round one before the last round, the S, MC, and ARK are performed on the intermediate data in a unit of 32 bits, and the SR is performed on the whole 128-bit data. In the last round, the S and ARK are performed in a unit of 23 bits so as to generate an encrypted text, and this encrypted text is stored in the data registers d0 to d3.

The decryption process for decrypting the encrypted text is the same, except that the S, SR, and MC in the encryption process are respectively changed to IS, ISR, and IMC. Therefore, the detailed description will not be repeated.

FIG. 15 is a view for describing the encryption process by the encryption processing apparatus according to the second example, where the data stored in the key register 602, data registers d0 to d3, and the random number registers r0 to r4, and the process (the data latched in the next clock) executed to each data is illustrated for each clock (Clock). Although Clock=0-10 is exemplified in FIG. 15, the process corresponding to the number of clocks corresponding to the specified number of processing round determined according to an encryption algorithm to be adapted is executed.

In FIG. 15, the key register 602 is named as k0 to k3 for 32 bits each. The key data or the expanded key stored in the key register 602 (k0 to k3) is prefixed by K, the data or the intermediate data stored in the data registers d0 to d3 is prefixed by D, the mask value or the intermediate mask, and the data for removing the mask stored in the random number registers r0 to r4 is prefixed by R. The numerical value of each data is such that the head numerical value indicates the byte position (in a unit of 32 bits), and the next numerical value indicates the number of times of the processing round. On the end of each data, a numerical value or character different between the case before the update and the case after the update is applied so as to indicate that the data is updated.

In the encryption processing apparatus according to the second example, the key data (K30, K20, K10, K00) stored in the key register [k3, k2, k1, k0] is not updated during the period of Clock=1 to 4 as illustrated in FIG. 15. In the case of Clock=5, the sbox+α is performed on the content of the key register [k3, k2, k1, k0], whereby the expanded key (K31, K21, K11, K01) is generated, and stored in the key register [k3, k2, k1, k0].

During the period of Clock=1 to 4, the ARK is performed on the data (D300, D200, D100, D000) stored in the data register [d3, d2, d1, d0] sequentially from the top data D300, whereby the intermediate data (D301, D201, D101, D001) is generated. In the case of Clock=5, the SR is performed on the intermediate data (D301, D201, D101, D001) stored in the data register [d3, d2, d1, d0], whereby the intermediate data (D310, D210, D110, D010) is generated.

During the period of Clock=1 to 4, the mask value stored in the random number register r4 is sequentially stored in the random number register r0, random number register r1, random number register r2, and random number register r3. On Clock=5, the linear transformation by the linear transformation circuit C and the S by the S/IS 404 are performed on the mask value R000 extracted from the random number register r4, whereby the intermediate mask R310 is generated. On Clock=5, the SR is performed on the whole mask value (R301, R201, R101, R001) stored in the random number registers r3, r2, r1, and r0, whereby the data (R30$d$, R20$d$, R10$d$, R00$d$) for removing the mask is generated.

During the period of Clock=6 to 9, the key data (K31, K21, K11, K01) stored in the key register [k3, k2, k1, k0] is not updated. On Clock=10, the sbox+α is performed to generate a new expanded key, and the generated expanded key is stored in the key register [k3, k2, k1, k0].

During the period of Clock=6 to 9, the S, MC, and ARK are performed on the data (D310, D210, D110, D010) stored in the data register [d3, d2, d1, d0] sequentially from the top data D310, whereby the intermediate data (D312, D212, D112, D011) is generated. In the case of Clock=10, the SR is performed on the whole intermediate data (D312, D212, D112, D011) stored in the data register [d3, d2, d1, d0], whereby new intermediate data (D320, D220, D120, D020) is generated.

During the period of Clock=6 to 9, the linear transformation by the linear transformation circuit C and the S utilizing the sbox+α in the key updating unit 603 are performed on the intermediate mask (R310, R210, R110, R010) extracted from the random number register r4, whereby new intermediate mask (R210, R110, R010, R320) is generated. During the period of Clock=6 to 9, the MC is performed on the intermediate mask (R310, R210, R110, R010) extracted from the random number register r4, and the SR is performed on the whole resultant data (R311, R211, R111, R011) on Clock=10, whereby the data (R31$d$, R21$d$, R11$d$, R01$d$) for removing the mask is generated.

As described above, in the encryption processing apparatus according to the second example, the intermediate data having dependency with the secret key is stored in the data registers r0 to r3 as being masked by the intermediate mask generated by reusing the inputted mask value. Therefore, the encryption processing apparatus according to the second example makes the estimation of the secret key impossible, thereby being capable of invalidating the DPA attack. The intermediate mask is generated such that the S/IS 404 in the data processing unit 400 or the sbox+α mounted in the key updating unit 603 in the key schedule unit 600 is employed to reuse the mask value. Therefore, it is unnecessary to mount a random number generator circuit in addition to the encryption circuit, whereby the circuit scale can be made compact, and the reduction in the power consumption can be realized.

The encryption processing apparatus according to the second example is configured to sequentially process 128-bit data block in a unit of 32 bits. Therefore, the circuits performing the S, IS, MC, and IMC can be the ¼ in size of the circuits in the encryption processing apparatus according to the first example. Accordingly, the circuit scale can be made more compact.

The encryption processing apparatus according to the second example utilizes the S/IS 404 in the data processing unit 400 and the sbox+α mounted in the key updating unit 603 in the key schedule unit 600. Therefore, the computation for the encryption or decryption and the generation of the intermediate mask can be carried out on the same clock, which can prevent the increase in the latency.

The encryption processing apparatus according to the second example utilizes the S/IS 404 having the circuit structure illustrated in FIG. 14 in order to realize a compact circuit scale. Only the IGF in FIG. 14 may be used for the non-linear transformation employed for the generation of the intermediate mask. However, in the case of the circuit structure that independently performs the S and IS as in the first example, instead of providing the S/IS 404, a new intermediate mask can be generated by using either one of the non-linear transformation, which is not used for the encryption process or for the decryption process, out of the S and IS, without using the sbox+α mounted in the key updating unit 603 in the key schedule unit 600. Accordingly, with this structure, the non-linear transformation for generating a new intermediate mask is performed, so that the sbox+α mounted in the key updating unit 603 in the key schedule unit 600 does not have to be used.

Figure 16:
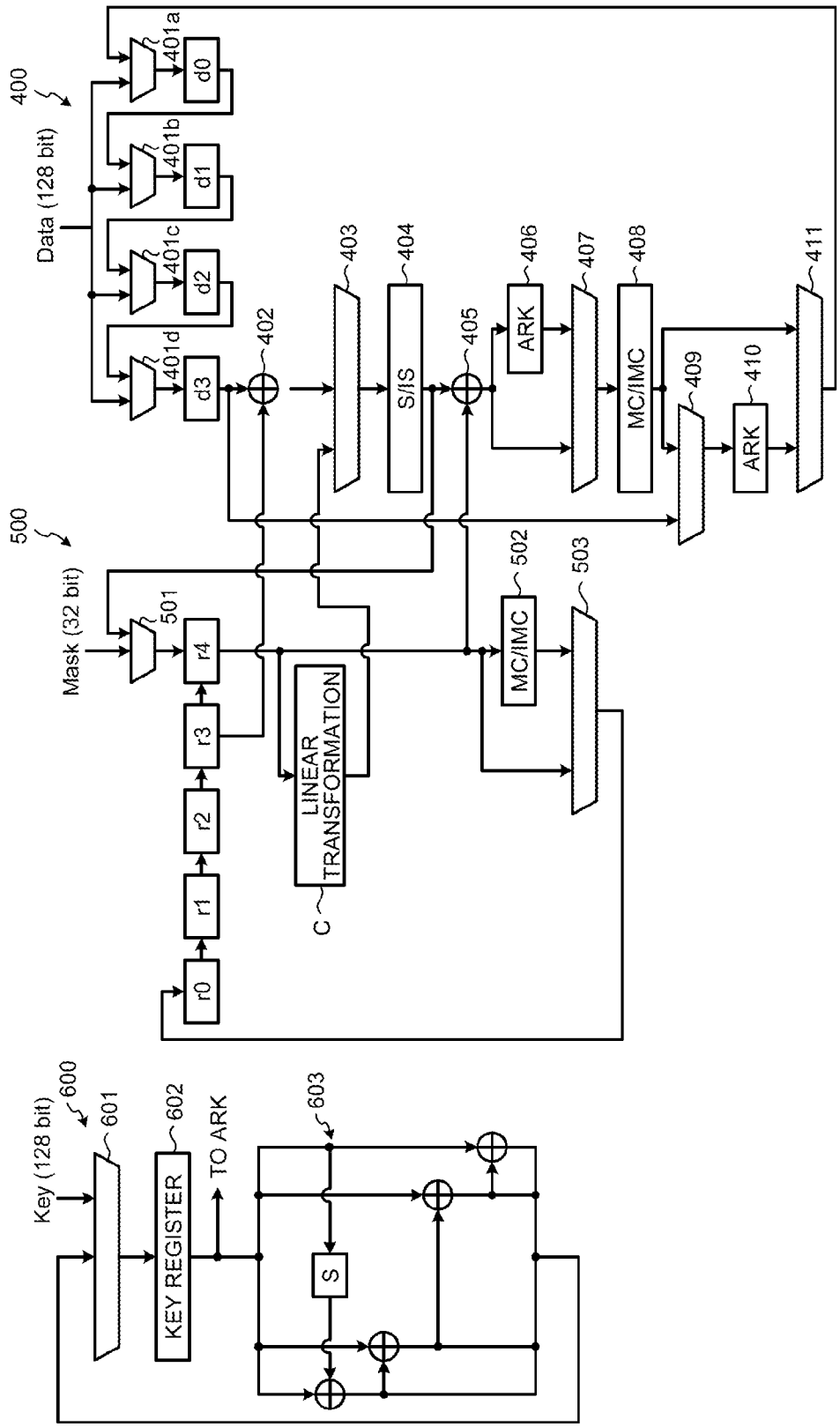
FIG. 16 is a circuit diagram illustrating a modification of the encryption processing apparatus according to the second example.

If the increase in the latency is allowed, the non-linear transformation for generating a new intermediate mask may be performed by using only the S/IS 404 in the data processing unit 400 in the compact circuit structure using the S/IS 404 as illustrated in FIG. 16.

FIG. 17 is a view for describing a data flow in an encryption process by an encryption processing apparatus having a circuit structure illustrated in FIG. 16. FIG. 17 is compared to FIG. 15. In the example in FIG. 15, the new intermediate mask (R210, R110, 8010, R310) is generated by utilizing the sbox+α mounted in the key updating unit 603 during the period of Clock=6 to 9. On the other hand, in the example in FIG. 17, the new intermediate mask R210 is generated by utilizing the S/IS 404 in the data processing unit 400 on Clock=7. The new intermediate mask R110 is generated by utilizing the S/IS 404 in the data processing unit 400 on Clock=9. The new intermediate mask R010 is generated by utilizing the S/IS 404 in the data processing unit 400 on Clock=11. The new intermediate mask R320 is generated by utilizing the S/IS 404 in the data processing unit 400 on Clock=13.

If the increase in the latency is allowed, the non-linear transformation for generating a new intermediate mask may be performed by using only the sbox+α in the key updating unit 603 in the compact circuit structure using the S/IS 404 as illustrated in FIG. 18.

FIG. 19 is a view for describing a data flow in an encryption process by an encryption processing apparatus having a circuit structure illustrated in FIG. 18. FIG. 19 is compared to FIG. 15. In the example in FIG. 15, the intermediate mask R310 is generated fром the mask value R000 extracted from the random number register r4 by utilizing the S/IS 404 on Clock=5. On the other hand, in the example in FIG. 19, the intermediate mask R310 is generated by utilizing the sbox+α in the key updating unit 603.

As described above in detail taking specific embodiments as examples, the encryption processing apparatus according to the embodiments of the present invention makes the estimation of the secret key impossible, while suppressing the increase in the circuit scale and power consumption, thereby being capable invalidating the side-channel attack.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encryption processing apparatus comprising:
a data register configured to retain data to be processed;
a mask register configured to retain mask data;
a first linear transformation circuit configured to perform a linear transformation from the mask data to first mask data;
a second linear transformation circuit configured to perform a linear transformation from the mask data to second mask data;
a first calculator configured to calculate first data based upon the data to be processed retained in the data register and the first mask data;
a selector configured to select either one of the first data and the second mask data;
a non-linear transformation circuit configured to perform a non-linear transformation on the first data or the second mask data selected by the selector;
a second calculator configured to calculate second data based upon the first data on which the non-linear transformation is performed by the non-linear transformation circuit, and the mask data retained in the mask register; and
a third linear transformation circuit configured to perform a linear transformation on the second data, wherein
the second data on which the linear transformation is performed by the third linear transformation circuit is retained in the data register as new data to be processed, and
the second mask data on which the non-linear transformation is performed by the non-linear transformation circuit is retained in the mask register as new mask data.

2. The apparatus according to claim 1, wherein
the non-linear transformation circuit includes a first circuit performing a non-linear transformation in an encryption process, and a second circuit performing a non-linear transformation in a decryption process, the first circuit and the second circuit operating independently.

3. An encryption processing apparatus comprising:
a data register configured to retain data to be processed;
a mask register configured to retain mask data;
a key register configured to retain key data;
a first linear transformation circuit configured to perform a linear transformation from the mask data to first mask data;
a second linear transformation circuit configured to perform a linear transformation from the mask data to second mask data;
a first calculator configured to calculate first data based upon the data to be processed retained in the data register and the first mask data;
a first non-linear transformation circuit configured to perform a non-linear transformation on the first data;
a second calculator configured to calculate second data based upon the first data on which the non-linear transformation is performed by the first non-linear transformation circuit, and the mask data retained in the mask register;
a third linear transformation circuit configured to perform a linear transformation on the second data;
a selector configured to select either one of the key data retained in the key register and the second mask data; and
a second non-linear transformation circuit configured to perform a non-linear transformation on the key data or the second mask data selected by the selector, wherein
the second data on which the linear transformation is performed by the third linear transformation circuit is retained in the data register as new data to be processed,
the key data on which the non-linear transformation is performed by the second non-linear transformation circuit is retained in the key register as new key data, and
the second mask data on which the non-linear transformation is performed by the second non-linear transformation circuit is retained in the mask register as new mask data.

4. An encryption processing apparatus comprising:
a data register configured to retain data to be processed;
a mask register configured to retain mask data;
a key register configured to retain key data;
a first linear transformation circuit configured to perform a linear transformation from the mask data to first mask data;
a second linear transformation circuit configured to perform a linear transformation from the mask data to second mask data;
first calculator configured to calculate first data based upon the data to be processed retained in the data register and the first mask data;
a first selector configured to select either one of the first data and the second mask data;
a first non-linear transformation circuit configured to perform a non-linear transformation on the first data or the second mask data selected by the first selector;
a second calculator configured to calculate second data based upon the first data on which the non-linear transformation is performed by the first non-linear transformation circuit, and the mask data retained in the mask register;
a third linear transformation circuit configured to perform a linear transformation on the second data;
a second selector configured to select either one of the key data retained in the key register and the second mask data; and
a second non-linear transformation circuit configured to perform a non-linear transformation on the key data or the second mask data selected by the second selector, wherein
the second data on which the linear transformation is performed by the third linear transformation circuit is retained in the data register as new data to be processed,
the key data on which the non-linear transformation is performed by the second non-linear transformation circuit is retained in the key register as new key data, and
the second mask data on which the non-linear transformation is performed by the first non-linear transformation circuit or the second non-linear transformation circuit is retained in the mask register as new mask data.

* * * * *